United States Patent
Shiraishi

(10) Patent No.: US 10,740,653 B2
(45) Date of Patent: Aug. 11, 2020

(54) LEARNING DATA GENERATION DEVICE, LEARNING DATA GENERATION METHOD, AND RECORDING MEDIUM

(71) Applicant: NEC Corporation, Minato-ku, Tokyo (JP)

(72) Inventor: Soma Shiraishi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/495,881

(22) PCT Filed: Apr. 3, 2018

(86) PCT No.: PCT/JP2018/014270
§ 371 (c)(1),
(2) Date: Sep. 20, 2019

(87) PCT Pub. No.: WO2018/186398
PCT Pub. Date: Oct. 11, 2018

(65) Prior Publication Data
US 2020/0012893 A1    Jan. 9, 2020

(30) Foreign Application Priority Data
Apr. 7, 2017 (JP) .................. 2017-076765

(51) Int. Cl.
*G06K 9/62* (2006.01)
*G06N 20/00* (2019.01)
*G06K 9/00* (2006.01)

(52) U.S. Cl.
CPC ....... *G06K 9/6257* (2013.01); *G06K 9/00664* (2013.01); *G06K 9/6262* (2013.01); *G06N 20/00* (2019.01); *G06K 2209/21* (2013.01)

(58) Field of Classification Search
CPC ............ G06K 9/6257; G06K 9/00664; G06K 9/6262; G06N 20/00
(Continued)

(56) References Cited

U.S. PATENT DOCUMENTS

| 6,715,293 B2 | 4/2004 | Sillence et al. |
| 2005/0220341 A1* | 10/2005 | Akahori ............. G06K 9/00664 382/170 |
| 2015/0371388 A1* | 12/2015 | Ishida ..................... G06T 17/20 382/294 |

FOREIGN PATENT DOCUMENTS

| JP | 2011-216087 A | 10/2011 |
| JP | 2013-156718 A | 8/2013 |

(Continued)

OTHER PUBLICATIONS

Naveet Dalal et al., "Histograms of Oriented Gradients for Human Detection", Proceedings of the 2005 IEEE Computer Society Conference on Computer Vision and Pattern Recognition, Jun. 2005, vol. 1, pp. 886-893 (8 pages total).
(Continued)

*Primary Examiner* — Michael R Neff

(57) ABSTRACT

This learning data generation device (10) is provided with: an identification unit (11) which identifies a subject included in a first captured image, and generates an identification result in which information indicating the type and existence of the identified subject or the motion of the identified subject is associated with the first captured image; and a generation unit (12) which generates learning data on the basis of the identification result and a second captured image, which is associated with the first captured image but is different in type from the first captured image.

15 Claims, 16 Drawing Sheets

(58) Field of Classification Search
USPC .......................................................... 382/103
See application file for complete search history.

(56) References Cited

FOREIGN PATENT DOCUMENTS

| | | |
|---|---|---|
| JP | 2014-052977 A | 3/2014 |
| JP | 2014-178957 A | 9/2014 |
| JP | 2017-037424 A | 2/2017 |
| WO | 2008/047835 A1 | 4/2008 |

OTHER PUBLICATIONS

Hashimoto Manabu, The appeal of template matching-Typical technology for object detection and positioning—SSII2013 Tutorial lecture, Jun. 12, 2013, (104 pages total).

International Search Report dated Jul. 3, 2018, in International Application No. PCT/JP2018/014270.

Written Opinion of the International Searching Authority dated Jul. 3, 2018, in International Application No. PCT/JP2018/014270.

* cited by examiner

Fig.5

| CAPTURED IMAGE IDENTIFIER | RECTANGULAR SHAPE INFORMATION | LABEL |
|---|---|---|
| CAPTURED IMAGE 31B | (x1, y1), (x2, y2), (x3, y3), (x4, y4) | PERSON |
| ... | ... | ... |

LEARNING DATA GENERATION DEVICE, LEARNING DATA GENERATION METHOD, AND RECORDING MEDIUM

This application is a National Stage Entry of PCT/JP2018/014270 filed on Apr. 3, 2018, which claims priority from Japanese Patent Application 2017-076765 filed on Apr. 7, 2017, the contents of all of which are incorporated herein by reference, in their entirety.

TECHNICAL FIELD

The present disclosure relates to a learning data generation device, a learning data generation method, and a recording medium.

BACKGROUND ART

In identification processing using machine learning, there is a method called supervised learning in which a set of input data and a correct answer label corresponding to the input data is prepared as learning data to thereby update a parameter. For the learning data, it is effective to exhaustively use data which can be actually input when the identification processing is executed. In order to cover the data which can be input when the identification processing is executed, it is effective to prepare a large amount of the learning data, or to use, for the identification processing, data acquired in an environment similar to an environment where recognition processing is performed. However, correct answer data for use in the identification processing are manually assigned in general, and accordingly, there is a problem that human cost is increased when an amount of the data is increased.

PTL 1 describes a learning data generation system that generates learning data by extracting an object region, which is a region on which an object is captured, from respective object-captured images captured while continuously changing imaging conditions such as information regarding a position of a camera with respect to such a subject.

Moreover, PTL 2 describes an active learning system that, with regard to data in which a value of a label is unknown, calculates a similarity thereof to data in which a value of a label is a predetermined value, and selects data to be learned next on the basis of the calculated similarity.

Furthermore, PTL 3 describes one example of a technique for detecting and tracking a position of a person by using measurement data of a laser range sensor.

CITATION LIST

Patent Literature

[PTL 1] Japanese Unexamined Patent Application Publication No. 2014-178957
[PTL 2] International Publication No. WO 2008/047835
[PTL 3] Japanese Unexamined Patent Application Publication No. 2013-156718
[PTL 4] U.S. Pat. No. 6,715,293

Non-Patent Literature

[NPL 1] Naveet Daniel, Bill Triggs, "Histograms of Oriented Gradients for Human Detection", Proceedings of the 2005 IEEE Computer Society Conference on Computer Vision and Pattern Recognition (CVPR'05), U.S.A, IEEE Computer Society, 06.2005, Volume1-Volume01, p. 886-893

[NPL 2] HASHIMOTO Manabu, "Fascination of Template Matching—Standard Technique for Object Detection/Positioning—" (http://isl.sist.chukyo-u.ac.jp/Archives/SSII2013TS-Hashimoto.pdf), 19th Image Sensing Symposium Tutorial Conference, presented on Jun. 12, 2013

SUMMARY OF INVENTION

Technical Problem

In the technique described in PTL 1, learning data are generated while changing imaging conditions including at least information regarding a position of a camera. Accordingly, for example, it is sometimes difficult to automatically generate the learning data from a captured image captured by a camera of which information regarding a position is unchangeable.

Moreover, in the technique described in PTL 2, correct answer labeling to the selected data is manually performed, and accordingly, there is a possibility that human cost required for the labeling may be increased as an amount of the data are being increased.

The present disclosure has been made in view of the above-described problems, and an object of the present disclosure is to provide a technique for efficiently generating learning data.

Solution to Problem

An aspect of the disclosure is a learning data generation device. The learning data generation device includes identifying means for identifying a target included in a first captured image, and generating an identification result in which a type, presence of the identified target, or a motion of the identified target is associated with the first captured image; and generating means for generating learning data, based on the identification result and a second captured image that is related to the first captured image and different in type from the first captured image.

An aspect of the disclosure is a learning data generation method. The learning data generation method includes identifying a target included in a first captured image, and generating an identification result in which a type, presence of the identified target, or a motion of the identified target is associated with the first captured image; and generating learning data, based on the identification result and a second captured image that is related to the first captured image and different in type from the first captured image.

Note that, a computer program, which achieves the above-described device or method by using a computer, and a computer-readable non-transitory recording medium, in which the computer program is stored, are also incorporated in the scope of the present disclosure.

Advantageous Effects of Invention

According to the present disclosure, learning data can be generated efficiently.

BRIEF DESCRIPTION OF DRAWINGS

FIG. 5 is a diagram illustrating one example of an identification result output by the identification unit.

EXAMPLE EMBODIMENT

Figure 1:
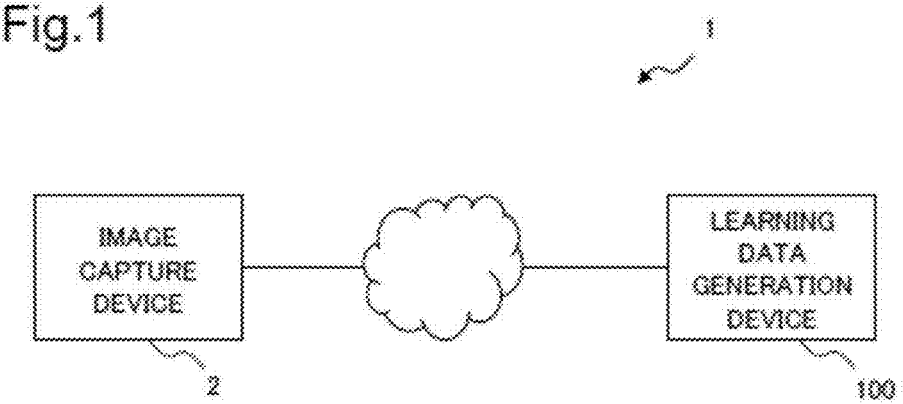
FIG. 1 is a diagram illustrating one example of a configuration of a learning data generation system product monitoring system including a learning data generation device according to a first example embodiment.

Hereinafter, example embodiments of the present disclosure will be described by using the drawings. Note that, in all the drawings, same reference numerals are assigned to same components, and a description thereof is omitted as appropriate. Moreover, unless particularly specified, each block in each block diagram indicates not a configuration in a hardware unit but a configuration in a functional unit.

First Example Embodiment

FIG. 1 is a diagram illustrating one example of a configuration of a learning data generation system 1 including a learning data generation device 100 according to the present example embodiment. As illustrated in FIG. 1, the learning data generation system 1 includes a learning data generation device 100 and an image capture device 2. The learning data generation device 100 communicably connects to the image capture device 2. Note that, though the present example embodiment will be described on the assumption that the learning data generation device 100 has a configuration separate from the image capture device 2, the learning data generation device 100 may be configured to be incorporated in the image capture device 2. Moreover, the image capture device 2 may be plural. Moreover, a video to be captured by the image capture device 2 may be a moving picture or continuous still images.

The image capture device 2 captures a target. For example, the target may be a product displayed on a product shelf of a shop, or may be a person. The target just needs to be one to be identified by an identification unit to be described later. For example, the image capture device 2 captures the product shelf of the shop, on which the product as the target is displayed. Then, the image capture device 2 transmits a video signal that indicates a captured image thus captured to the learning data generation device 100. For example, the image capture device 2 is a surveillance camera installed in the shop. The image capture device 2 may store the captured image inside the image capture device 2 or in a storage device different from the learning data generation device 100.

The present example embodiment will be described on the assumption that the image capture device 2 acquires two types of captured images. The present example embodiment will be described on the assumption that a first one of the captured images is a color image. Note that the captured image may be an image, for example, expressed by the Red, Green, Blue (RGB) image space, or may be an image in another color space.

Moreover, a second one of the captured images is an image of a type different from the color image. For example, the captured image may be an image acquired by a near-infrared camera, a far-infrared camera, or the like, or may be a distance image acquired by a depth camera.

Note that, the present example embodiment will be described on the assumption that the image capture device 2 includes a depth camera that acquires a distance image as a first captured image, and an RGB camera that acquires an RGB image as the second captured image.

When the RGB camera and the depth camera in the image capture device 2 are different devices, the RGB camera and the depth camera are provided at positions close to each other, and capture the same position or the same object (for example, a product shelf). Moreover, it is preferable that time synchronization be established between the RGB camera and the depth camera, and that an object related to the target be captured thereby at substantially the same time. In other words, it is preferable that the depth camera be a camera that outputs a distance image in which an image capture range of an RGB image captured by the RGB camera is captured within a predetermined time from an image capture time of the RGB image. Moreover, the image capture device 2 may be a sensor capable of acquiring plural types of images (for example, the RGB image and the distance image). For example, the image capture device 2 may be an RGBD camera.

Figure 2:
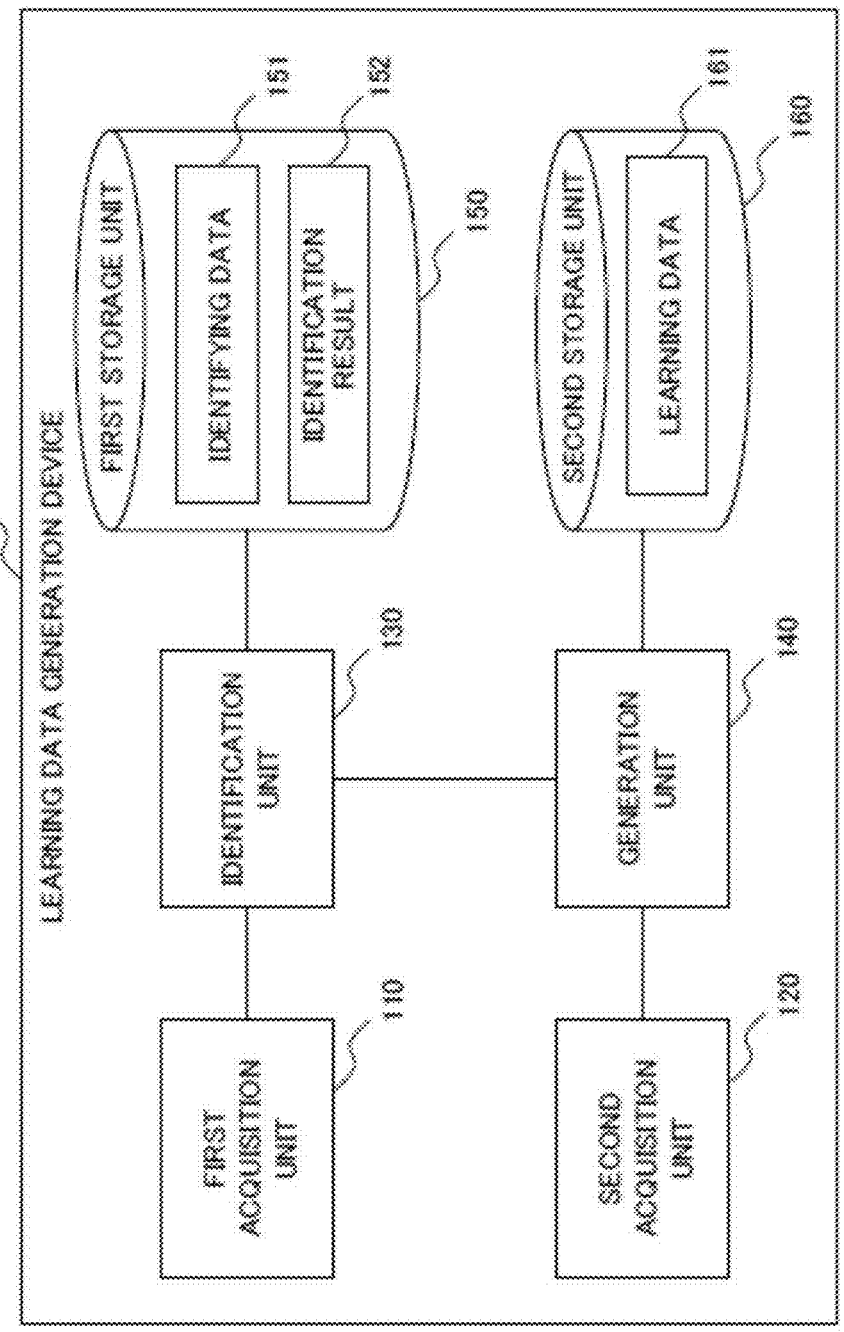
FIG. 2 is a functional block diagram illustrating one example of a functional configuration of the learning data generation device according to the first example embodiment.

FIG. 2 is a functional block diagram illustrating one example of a functional configuration of the learning data generation device 100 according to the present example embodiment. As illustrated in FIG. 2, the learning data generation device 100 includes a first acquisition unit 110, a second acquisition unit 120, an identification unit 130, a generation unit 140, a first storage unit 150, and a second storage unit 160.

The first acquisition unit 110 and the second acquisition unit 120 acquire signals different in type from each other. For example, the first acquisition unit 110 acquires a signal that indicates the distance image as the first captured image. The first acquisition unit 110 may receive a signal transmitted from the image capture device 2, or may acquire a signal converted on the basis of such a first captured image stored inside the image capture device 2 or in a storage device different from the image capture device 2 and the learning data generation device 100.

The second acquisition unit 120 acquires a signal that indicates the RGB image as the second captured image. The second acquisition unit 120 may receive a signal transmitted from the image capture device 2, or may acquire a signal converted on the basis of such a second captured image stored inside the image capture device 2 or in a storage device different from the image capture device 2 and the learning data generation device 100.

Note that, the first acquisition unit 110 and the second acquisition unit 120 may be configured to acquire the first captured image and the second captured image themselves when the learning data generation device 100 is incorporated in the image capture device 2.

Figure 3:
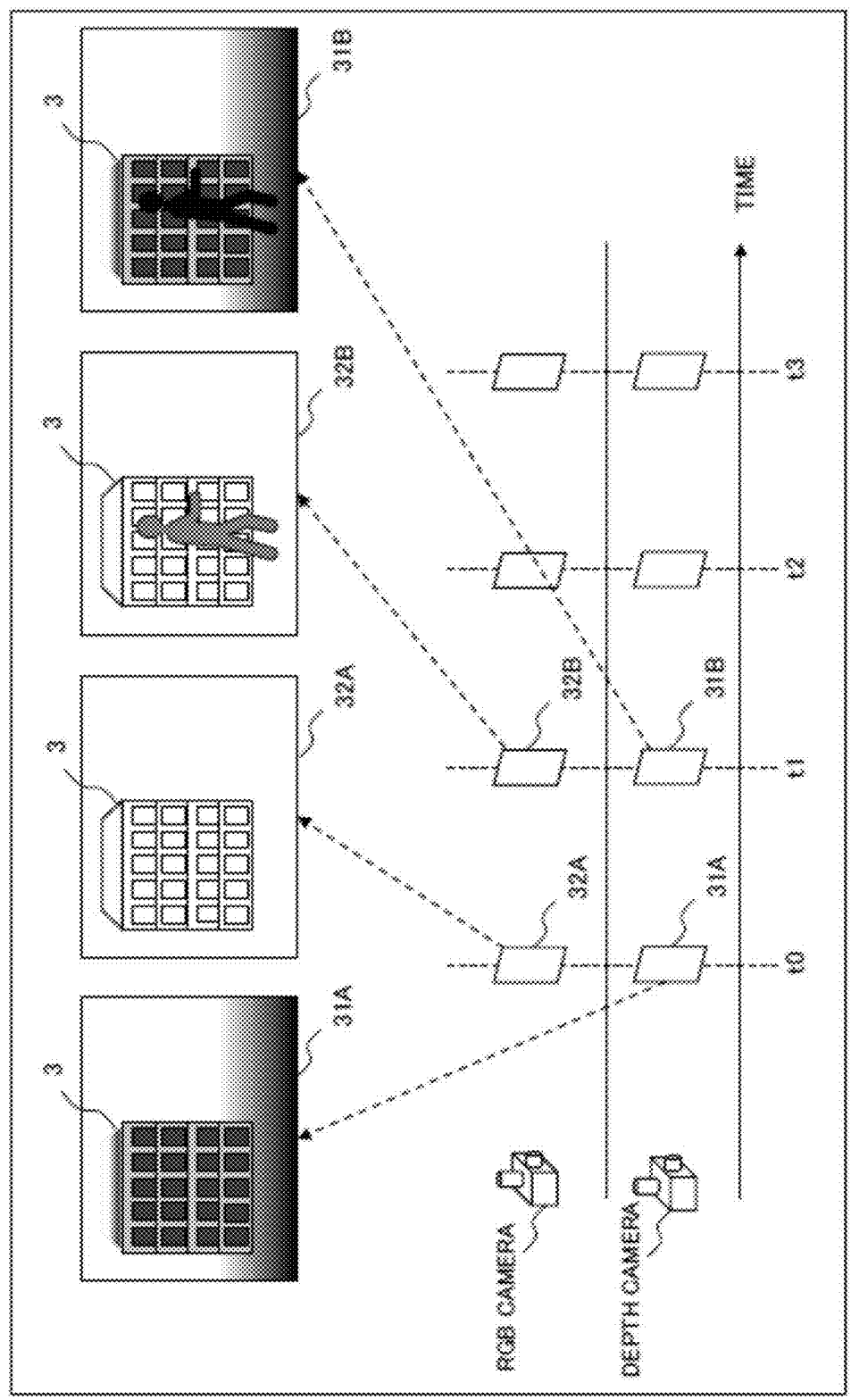
FIG. 3 is a diagram for explaining a first captured image and a second captured image.

The first captured image and the second captured image, which are to be acquired by the first acquisition unit 110 and the second acquisition unit 120, will be described with reference to FIG. 3. FIG. 3 is a diagram for explaining the first captured image and the second captured image. An axis of abscissas, which is illustrated in FIG. 3, is a time axis. The depth camera and the RGB camera in the image capture device 2 repeatedly perform image capturing while synchronizing with each other. In a captured image 31A as a first captured image at a time t0 and a captured image 32A as a second captured image at the time t0, images of a same product shelf 3 are captured as illustrated in FIG. 3. Likewise, a captured image 31B as a first captured image at a time t1 and a captured image 32B as a second captured image at the time t1 are those acquired by capturing the same product shelf 3 as that in the captured image 31A and the captured image 32A at the time t1 later than the time t0.

The first acquisition unit 110 supplies the acquired first captured image to the identification unit 130. Moreover, the second acquisition unit 120 supplies the acquired second captured image to the generation unit 140. Note that, the first acquisition unit 110 may store the first captured image in the first storage unit 150. Moreover, the second acquisition unit 120 may store the second captured image in the second storage unit 160.

The first storage unit 150 stores identifying data 151 used by the identification unit 130 for identification. Moreover, the first storage unit 150 stores an identification result 152. The identifying data 151 and the identification result 152 will be described later.

The identification unit 130 identifies a target from the first captured images. The identification unit 130 receives the first captured images from the first acquisition unit 110. Then, the identification unit 130 identifies the target by using the received first captured images and the identifying data 151 stored in the identification unit 130. The identification unit 130 supplies the identification result to the generation unit 140. A specific example of the identification processing which the identification unit 130 performs will be described later. For example, upon being supplied with the first captured image from the first acquisition unit 110, the identification unit 130 may perform the identification processing therefor, or may perform a predetermined amount of the first captured images.

The generation unit 140 generates learning data on the basis of the identification result and the second captured image related to the first captured image. The generation unit 140 extracts an image in a region on the second captured image, which corresponds to a region of the identified target included in the identification result, from the second captured image. Herein, the second captured image corresponds to the first captured image related to the identification result supplied from the identification unit 130. Then, the generation unit 140 generates learning data in which the extracted image is given a label included in the identification result. Then, the generation unit 140 stores the generated learning data in the second storage unit 160.

The second storage unit 160 stores learning data 161 generated by the generation unit 140. Moreover, the second storage unit 160 may store the second captured image acquired by the second acquisition unit 120. Moreover, the second storage unit 160 may be configured separately from the first storage unit 150, or may be formed integrally therewith. The second storage unit 160 may be achieved by a storage device different from the learning data generation device 100.

Next, the processing of the identification unit 130 will be described more in detail.

(Identification Example 1)

A case where the identification unit 130 identifies a type of a target will be described. Specifically, a description will be made of a case where the identification unit 130 identifies whether a target included in the first captured image is a person or something else. It is assumed that the depth camera of the image capture device 2 captures an image of a surface of the product shelf 3, on which products are displayed, from a fixed point, for example. In this case, the first acquisition unit 110 acquires one reference image that has no person therein, and stores the acquired image as the identifying data 151 in the first storage unit 150. Then, the identification unit 130 acquires differences between the identifying data 151 as the reference image and the first captured images (for example, the captured image 31A and the captured image 31B, which are illustrated in FIG. 3), and obtains difference regions. For example, the identification unit 130 acquires a difference between each pixel of the identifying data 151 and each pixel of the first captured images, and defines, as a difference region, an aggregate of pixels in which the differences are a predetermined value or more. Then, the identification unit 130 determines whether a size of the difference region coincides with an average size of persons, thereby identifying whether the difference region is a person or something else. Moreover, from the difference region, the identification unit 130 acquires an outline of a person, a region of the person, and a position of the person on the first captured image.

Then, the identification unit 130 assigns a label to information thus acquired, and stores the information as the identification result 152 in the first storage unit 150.

Figure 4:
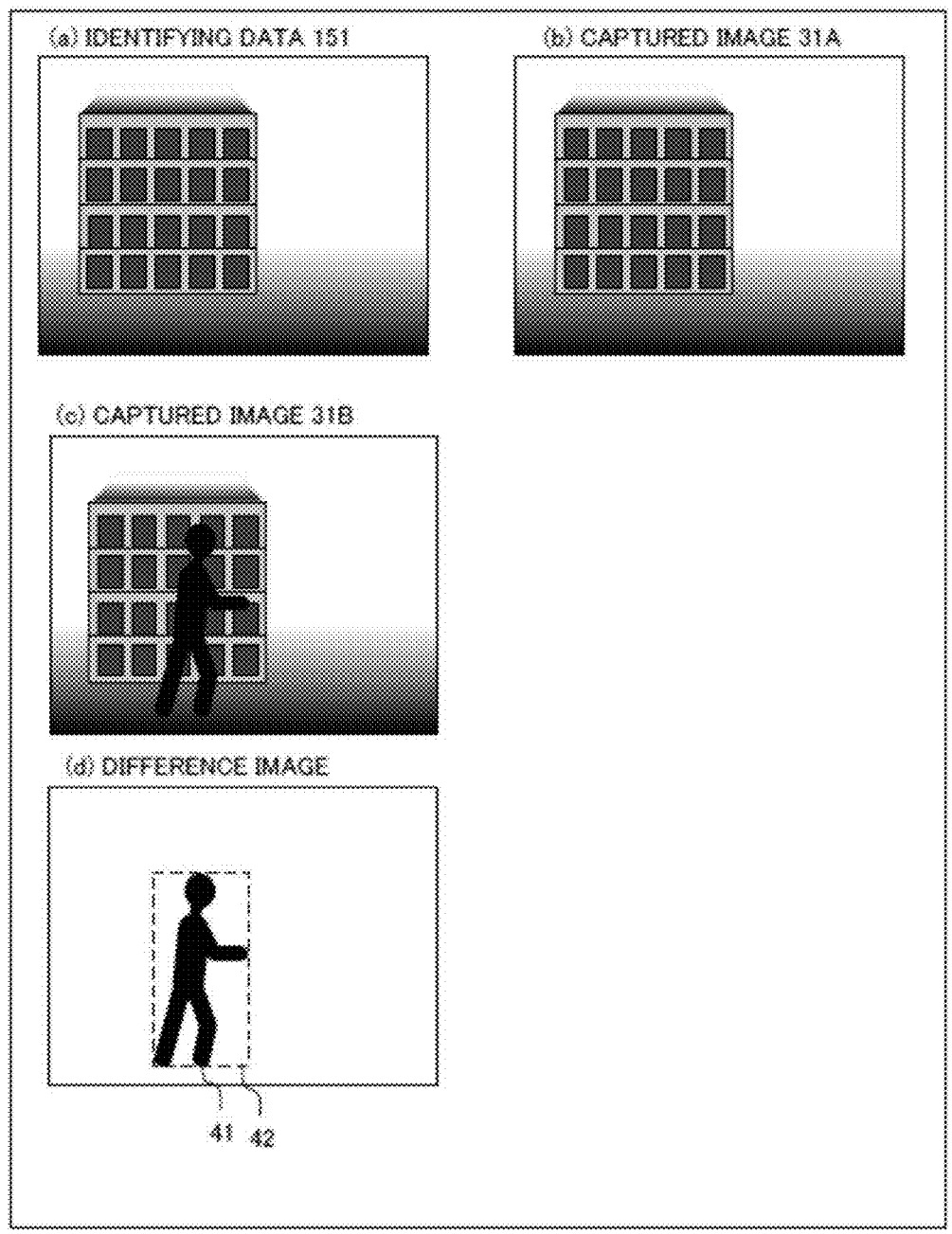
FIG. 4 is diagrams for explaining an operation of an identification unit.

The operation of the identification unit 130 will be further described by using FIG. 4. FIG. 4 is diagrams for explaining the operation of the identification unit 130. (a) of FIG. 4 illustrates one example of the identifying data 151 stored in the first storage unit 150. Note that, the identifying data 151 are assumed to be an image in which corresponding pixel values are approximate to those of the above-mentioned captured image 31A.

(b) of FIG. 4 is the above-mentioned captured image 31A. The identification unit 130 acquires a difference between the identifying data 151 and the captured image 31A. As mentioned above, the pixel values in the corresponding pixels are approximate between the identifying data 151 and the captured image 31A, and differences between the respective pixels become less than a predetermined value.

Hence, the identification unit 130 acquires a difference value in the next first captured image. (c) of FIG. 4 is the captured image 31B illustrated in FIG. 3. The captured image 31B includes a person. The identification unit 130 acquires a difference between the identifying data 151 and the captured image 31B, thereby acquiring a black portion (difference region 41) illustrated on a difference image of (d) pf FIG. 4. Note that, the difference image may be a binary image that has the same size as that of the first captured image, in which the difference region 41 is expressed in a form different from those of others.

Then, the identification unit 130 determines whether a size of the difference region 41 coincides with an average size of persons, thereby identifying whether the difference region is a person or something else.

Note that, for example, the identification unit 130 may identify a shopping basket or a shopping cart, or may identify a person who carries a shopping basket, a person who pushes a shopping cart, or the like.

Thereafter, the identification unit 130 acquires rectangular shape information that indicates a position and a size of a rectangular shape that circumscribes the difference region 41 as this black portion. Note that, a rectangular shape 42 represented by the rectangular shape information is indicated by a broken line in (d) of FIG. 4.

Note that, in the present example, the identification unit 130 is assumed to identify that a target detected as the difference region 41 as a person.

FIG. 5 is a diagram illustrating one example of the identification result 152 output by the identification unit 130. As illustrated in FIG. 5, the identification result 152 includes: a captured image identifier 51 that indicates the first captured image serving as an extraction source of the rectangular shape 42; rectangular shape information 52 that indicates the position and size of the rectangular shape 42 that circumscribes the difference region 41; and a label 53 that indicates the identified target (a type of the target).

Note that the rectangular shape information 52 may be composed of x coordinate values and y coordinate values on four corners of the rectangular shape 42, or may be composed of an x coordinate and a y coordinate, which represent at least one corner, and a width and height of the rectangular shape. Moreover, the label 53 may be information that represents a motion of the identified target.

(Identification Example 2)

Figure 6:
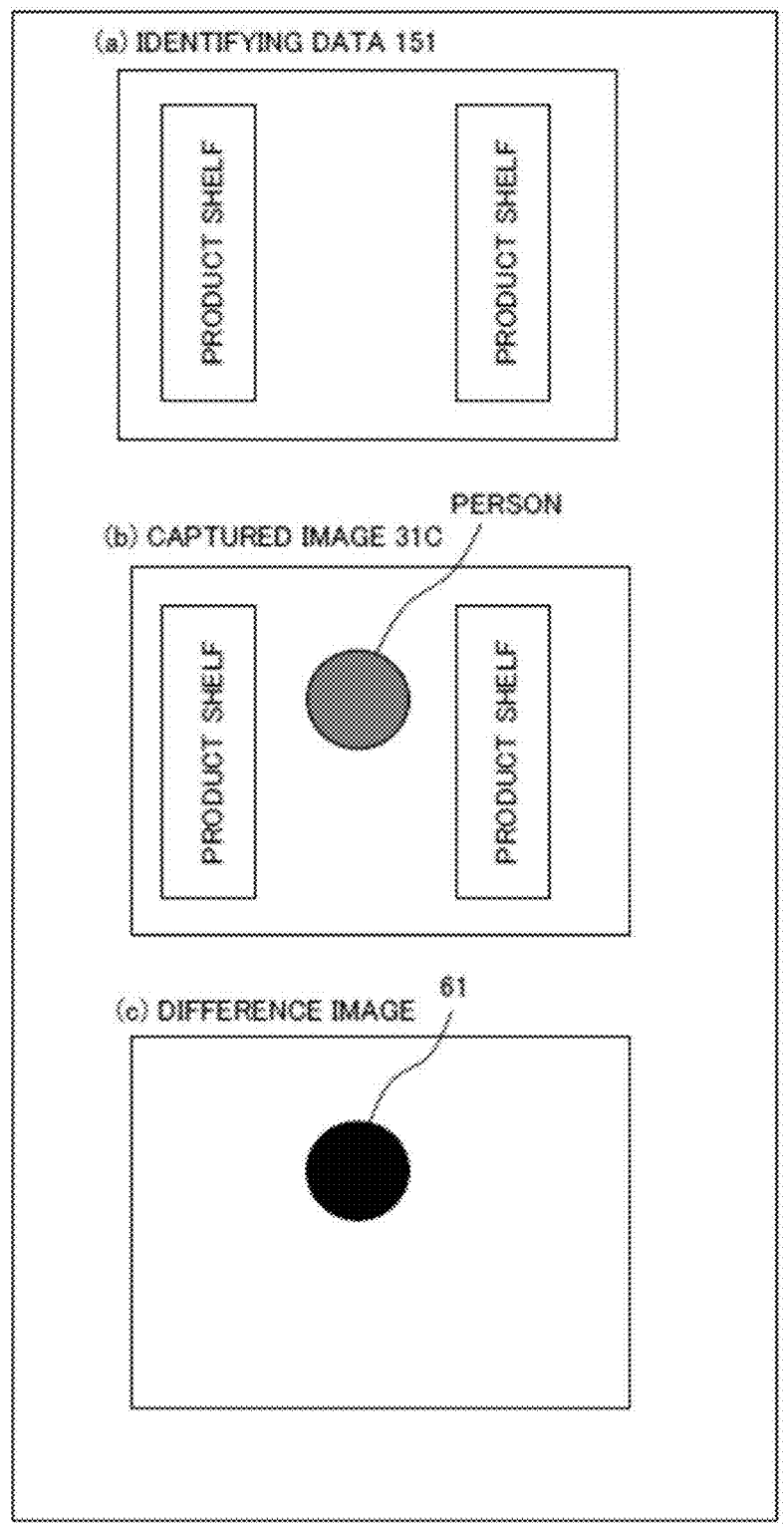
FIG. 6 is diagrams for explaining another example of the operation of the identification unit.

A case where the identification unit 130 identifies a type of the target will be described. Specifically, referring to FIG. 6, a description will be made of a case where the identification unit 130 identifies whether the target included in the first captured image is a head of a person or something else. FIG. 6 is diagrams for explaining another example of the operation of the identification unit 130. The present example will be described on the assumption that the depth camera of the image capture device 2 captures images of product shelves and persons in a shop, for example, from a fixed point with an overhead view. In this case, a reference image as illustrated in (a) of FIG. 6, in which no person is present, is defined as the identifying data 151. Note that position information that indicates at which position a ground plane is located is associated with the reference image. Then, the identification unit 130 acquires a difference between the identifying data 151 as the reference image and the first captured image (for example, a captured image 31C illustrated in (b) of FIG. 6, and obtains a difference region 61 included in a difference image of (c) of FIG. 6. Then, the identification unit 130 determines whether a distance of the difference region 61 from the ground plane coincides with an average height of persons, thereby determining whether difference region 61 is a head of a person or something else. Moreover, the identification unit 130 extracts a region of which height is equal to or larger than a certain value from among the difference region 61, and may thereby acquire a position of the head of the person.

(Identification Example 3)

A case where the identification unit 130 identifies a motion of the target will be described. Specifically, a description will be made of a case where the identification unit 130 identifies movement of the displayed product included in the first captured image. It is assumed that the depth camera of the image capture device 2 captures an image of a surface of the product shelf 3, on which such products are displayed, from a fixed point, for example. Moreover, it is assumed that sizes of the products displayed on the product shelf 3 are stored in advance in the first storage unit 150 and the like.

The identification unit 130 acquires a difference among a plurality of the first captured images acquired at a plurality of time points. In other words, in the present example, an image acquired temporarily before the first captured image as a target from which a difference is to be taken is defined as the identifying data 151. When a region indicated by the acquired difference, which is a region of which distance from the image capture device 2 becomes distant, has a similar size to a size of the product indicated by the identifying data 151, the identification unit 130 gives a label saying "product is acquired".

Moreover, when a region indicated by the acquired difference, which is a region of which distance from the image capture device 2 becomes near, has a similar size to the size of the product indicated by the identifying data 151, the identification unit 130 gives a label saying "product is restocked". Moreover, among the regions indicated by the acquired differences, when the region of which distance from the image capture device 2 becomes distant and the region of which distance from the image capture device 2 becomes near are adjacent to each other, and are smaller than the size of the product indicated by the identifying data 151, the identification unit 130 gives a label saying "product position has deviated".

Moreover, it is preferable that a distance from the image capture device 2 to the product shelf and a range of the captured image, where the product shelf is included, be stored in advance in the first storage unit 150 and the like. In this way, the identification unit 130 can perform the above-described identification processing while excluding an object (for example, a person who moves in front of the product shelf) other than the products displayed on the product shelf. Moreover, according to such a configuration, the identification unit 130 can identify the presence of the target, in which a person is included in the first captured image.

(Identification Example 4)

The identification unit 130 may perform the identification processing by using an identification instrument that has performed machine learning for a captured image acquired in advance by a depth camera similar to the depth camera of the image capture device 2. However, it is preferable that machine learning difficulty (a large quantity of misrecognitions when the same annotation cost is added) be less than that of identification processing to be performed by using the RGB image. For example, when a texture (surface pattern)

of an identification target is diverse, in a case where the second captured image is an image acquired by the RGB camera, and the first captured image is an image acquired by the depth camera, the near-infrared camera, the far-infrared camera, or the like, the first captured image can reduce such diversity of the texture of identification target more than the second captured image. Hence, the machine learning difficulty is reduced when the machine learning is performed by using the captured image such as the distance image more than when the machine learning is performed by using the RGB image.

In the first storage unit 150, the identification unit 130 stores, as the identification result 152, a result of identifying the target from the first captured image by using the identification instrument that has performed the machine learning.

Note that the identification processing which the identification unit 130 performs is not limited to the above-described one. It suffices if the identification unit 130 can identify at least one of the type, presence, and motion of the target on the basis of at least one of the size, shape, position, moving distance, and moving speed of the target. An identification method in this case is not particularly limited.

Figure 7:
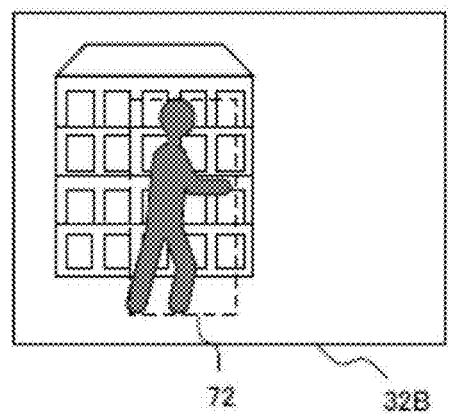
FIG. 7 is a diagram for explaining an operation of a generation unit.

Next, referring to FIG. 7, an operation of the generation unit 140 will be described. FIG. 7 is a diagram for explaining the operation of the generation unit 140.

In FIG. 7, the captured image 32B described with reference to FIG. 3 is illustrated. It is assumed that the identification unit 130 has outputted, for example, such an identification result 152 as illustrated in FIG. 5 by using the captured image 32A. From a captured image identifier 51 included in the identification result 152 supplied from the identification unit 130, the generation unit 140 acquires a second captured image, to which an image capturing time point and image capturing position of the first captured image indicated by the captured image identifier 51 corresponds, among the second captured images acquired by the second acquisition unit 120. As illustrated by using FIG. 3, the second captured image corresponding to the captured image 31B is the captured image 32B, and accordingly, the generation unit 140 determines that the second captured image serving as a generation source of the learning data is the captured image 32B.

Then, referring to the rectangular shape information 52, the generation unit 140 specifies a region on the captured image 32B, which corresponds to the rectangular shape information 52. As illustrated in FIG. 7, the region that corresponds to the rectangular shape information 52 is a region surrounded by a rectangular shape 72 indicated by a broken line. As described above, the generation unit 140 maps the rectangular shape, which is indicated by the rectangular shape information 52, on the captured image 32B, thereby specifying a position of the rectangular shape 72 on the captured image 32B. In this way, the generation unit 140 can specify that a region on the captured image 32B, which corresponds to the person's region, is the region surrounded by the rectangular shape 72. Hence, the generation unit 140 can generate the learning data 161 on the basis of the captured image 32B, information that indicates the position and a size of the rectangular shape 72, and the label 53.

Figure 8:
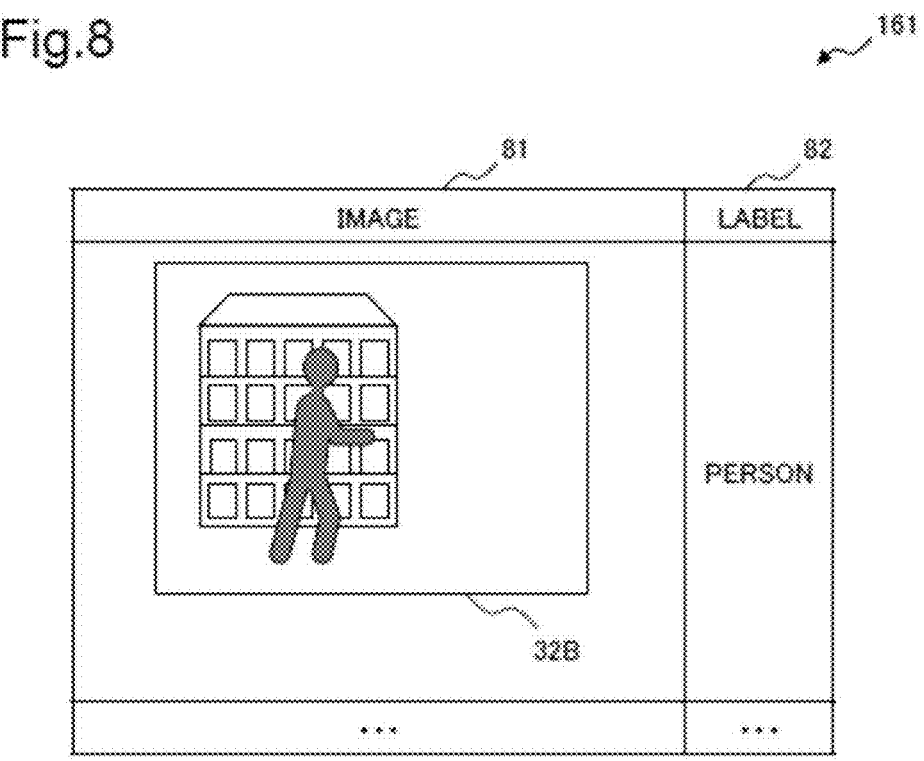
FIG. 8 is a diagram illustrating one example of learning data.
Figure 9:
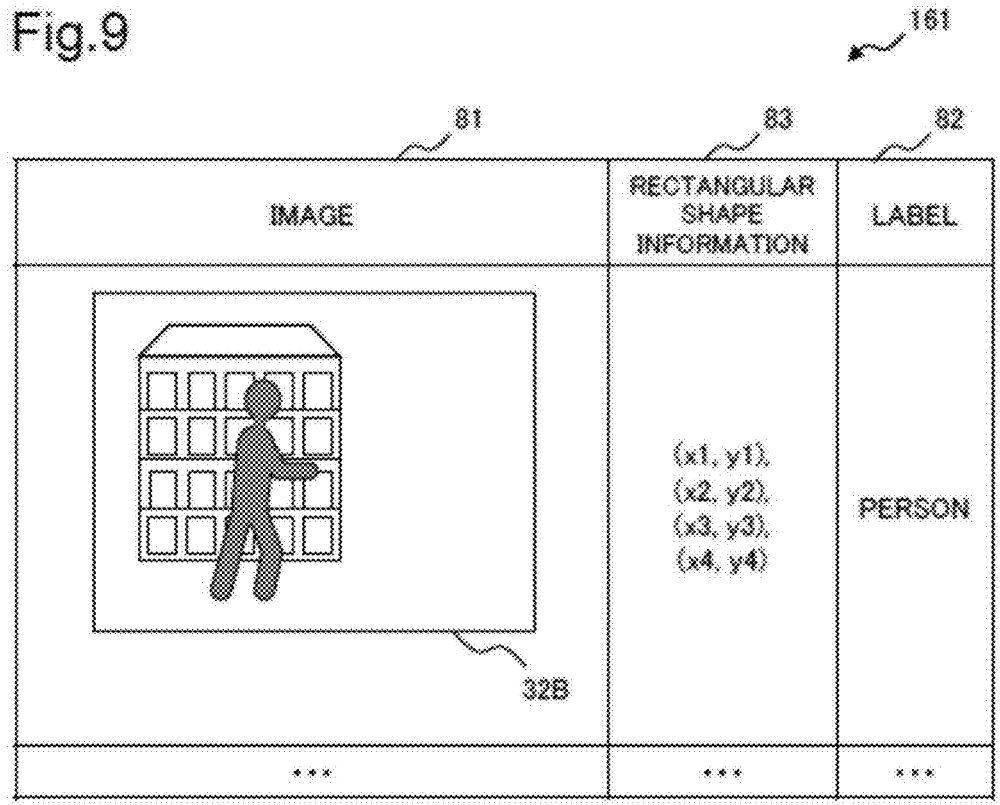
FIG. 9 is a diagram illustrating another example of the learning data.
Figure 10:
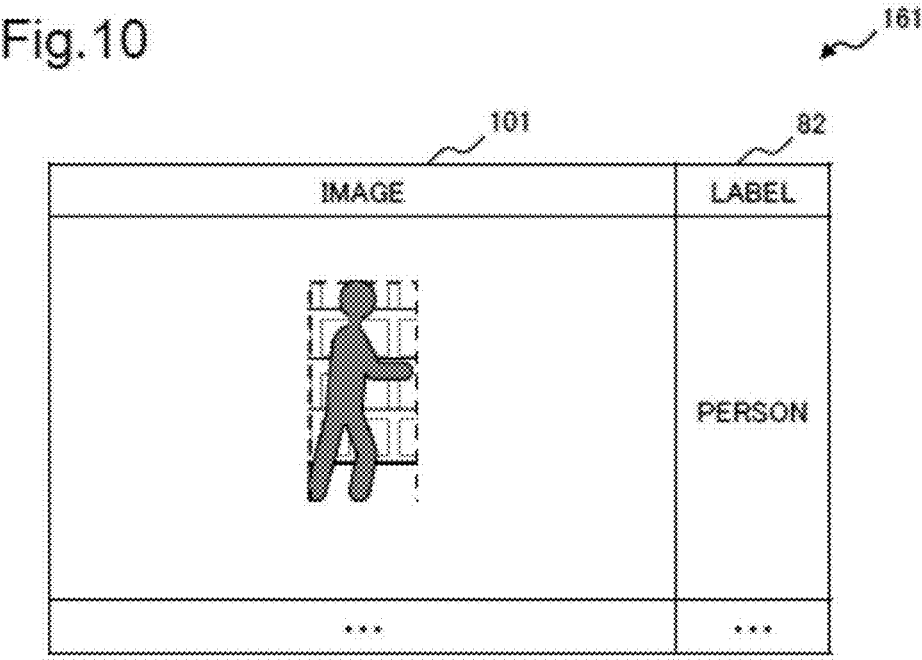
FIG. 10 is a diagram illustrating another example of the learning data.

FIGS. 8 to 10 are diagrams each illustrating one example of the learning data 161 to be generated by the generation unit 140 and to be stored in the second storage unit 160.

As illustrated in FIG. 8, the learning data 161 includes an image 81 and a label 82. The image 81 is the second captured image (for example, the captured image 32B) that corresponds to the first captured image used in the identification processing. Moreover, the label 82 is the label 53 that is a result of identifying the target included in the first captured image.

Moreover, as illustrated in FIG. 9, the learning data 161 may include the image 81, the label 82, and rectangular shape information 83. The rectangular shape information 83 is the rectangular shape information 52 included in the identification result 152.

Moreover, as illustrated in FIG. 10, in place of the image 81, the learning data 161 may include, as an image 101, a small region image acquired by extracting, from the second captured image, an image of a region indicated by the rectangular shape information 83.

As described above, as illustrated in FIG. 9, the generation unit 140 may generate the learning data 161 in which information that indicates a region on the second captured image, which corresponds to the region of the target identified by the identification unit 130, and information that indicates the type of the identified target or the motion of the identified target are associated with the second captured image. Moreover, as illustrated in FIG. 10, the generation unit 140 may generate the learning data 161 in which the image of the region on the second captured image, which corresponds to the region of the target identified in the second captured image by an identifying means, and the information that indicates the type of the identified target or the motion of the identified target are associated with each other.

The learning data generation device 100 can automatically generate the learning data 161 as described above.

Moreover, the learning data 161 are not limited to those illustrated as examples in FIGS. 8 to 10. For example, the learning data 161 may include time series data and a label given to the time series data. Herein, the time series data include a plurality of the second captured images. Moreover, the learning data 161 may include time series data and a label given to the time series data. Herein, the time series data include a plurality of the small region images. In the learning data 161, a plurality of labels may be given to the time series data including the plurality of second captured images or small region images.

Moreover, the generation unit 140 may generate learning data in which the label and an image feature amount (vector) such as histograms of oriented gradients (HOG; refer to NPL 1) extracted from the second captured image or the small region image of the second captured image are associated with each other.

Figure 11:
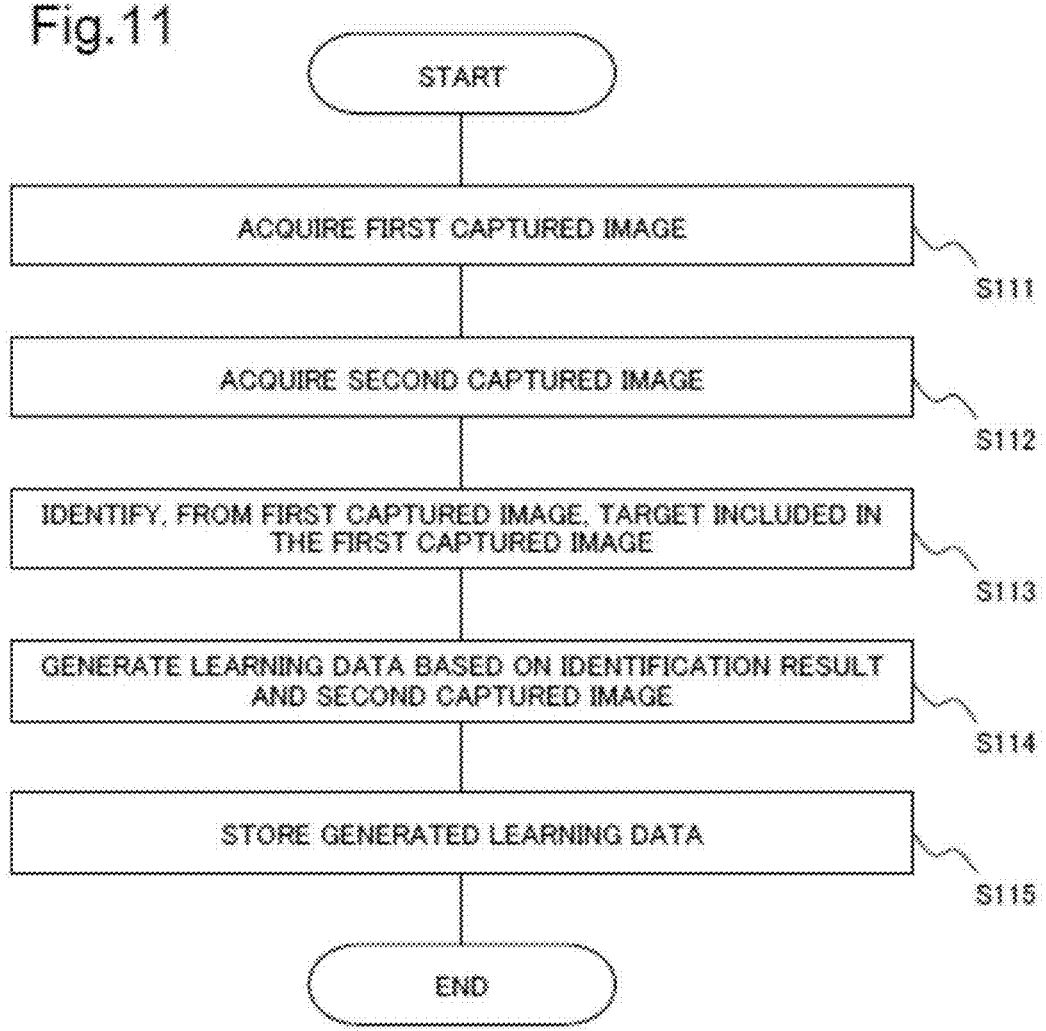
FIG. 11 is a flowchart illustrating one example of an operation flow of the learning data generation device according to the first example embodiment.

FIG. 11 is a flowchart illustrating one example of an operation flow of the learning data generation device 100 according to the present example embodiment.

As illustrated in FIG. 11, the first acquisition unit 110 acquires the first captured image (Step S111). Moreover, the second acquisition unit 120 acquires the second captured image (Step S112). Note that, Step S112 may be performed simultaneously with Step S111, or may be performed in a reverse order.

The identification unit 130 identifies the target, which is included in the first captured image, from the first captured image (Step S113). Then, the identification unit 130 generates the identification result in which the information that indicates the type, presence of the identified target, or the motion of the identified target is associated with the first captured image.

Then, the generation unit 140 generates the learning data 161 on the basis of the identification result and the second captured image that is related to the first captured image and acquired in Step S112 (Step S114). Then, the generation unit 140 stores the generated learning data 161 in the second storage unit 160 (Step S115).

Note that, it suffices if the second acquisition unit 120 acquires such a second captured image captured within a predetermined time from the time point when the first captured image is captured (for example, at the same time point). In other words, it suffices if the second acquisition unit 120 acquires a second captured image within a predetermined time from the time point when the first captured image acquired by the first acquisition unit 110 in Step S111 before Step S114 is captured.

As described above, the learning data generation device 100 according to the present example embodiment generates the learning data 161 on the basis of the rectangular shape information 52 and the label 53, which are included in the identification result obtained by performing the identification processing for the first captured image, and on the basis of the second captured image. In this way, the learning data generation device 100 can reduce the cost of the manual annotation work. Hence, the learning data generation device 100 can efficiently generate the learning data.

Second Example Embodiment

Figure 12:
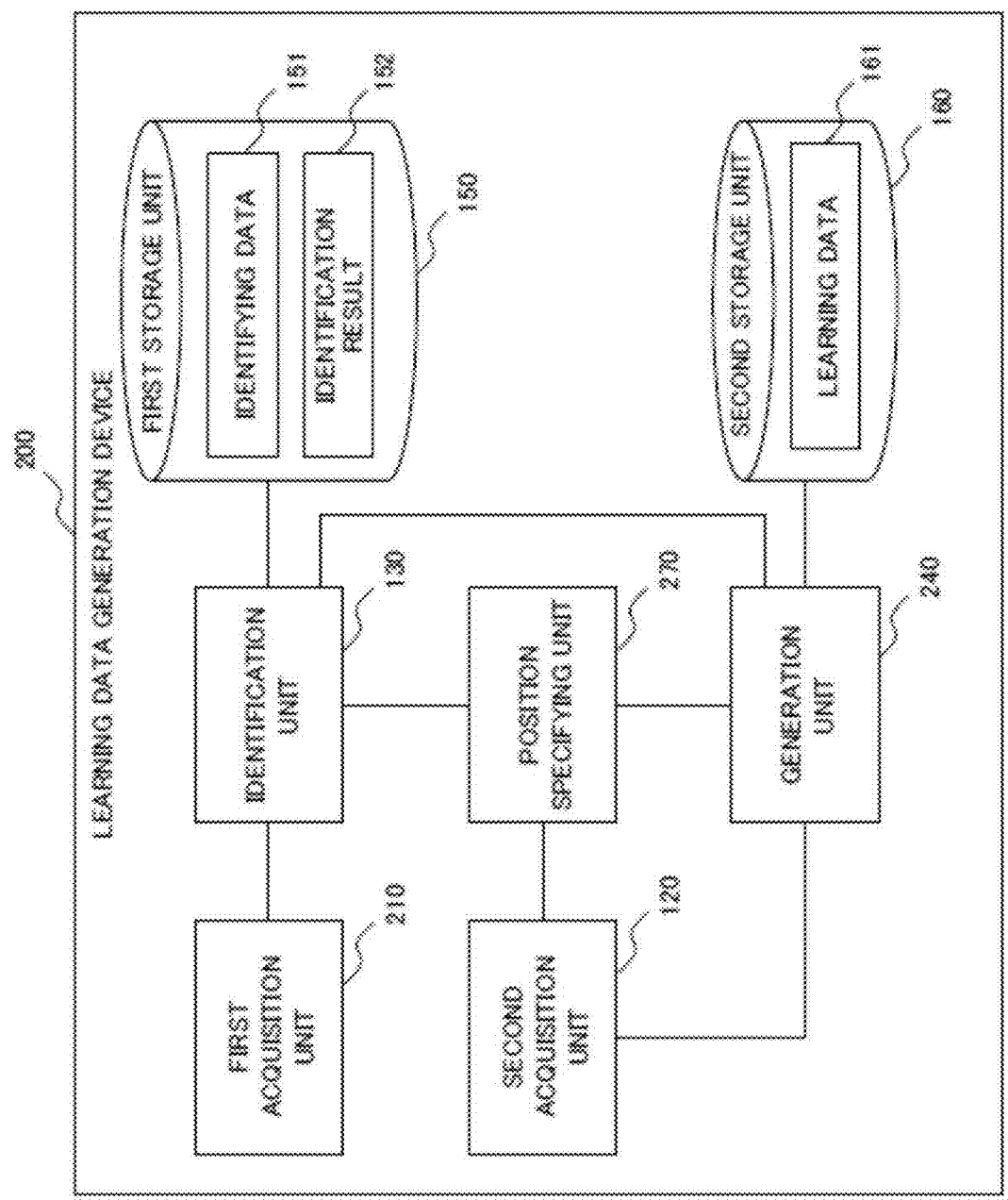
FIG. 12 is a functional block diagram illustrating one example of a functional configuration of an image processing device according to a second example embodiment.

A second example embodiment of the present disclosure will be described. FIG. 12 is a functional block diagram illustrating one example of a functional configuration of a learning data generation device 200 according to the present example embodiment. As illustrated in FIG. 12, the learning data generation device 200 according to the present example embodiment includes a first acquisition unit 210, a second acquisition unit 120, an identification unit 130, a generation unit 240, a first storage unit 150, a second storage unit 160, and a position specifying unit 270. Note that, the same reference numerals will be assigned to blocks which have the same functions as those of blocks included in the drawings described in the above-mentioned first example embodiment, and a detailed description thereof will be omitted.

By the position specifying unit 270, the learning data generation device 200 according to the present example embodiment maps a position on a first captured image and a position on a second captured image to each other. Note that, though the present example embodiment will be described on the assumption that the positions to be mapped to each other by the position specifying unit 270 are positions in two-dimensional spaces of the first captured image and the second captured image, a position in a three-dimensional space, which corresponds to the first captured image, and a position in a three-dimensional space, which corresponds to the second captured image, may be mapped to each other.

Note that, also in the present example embodiment, it is assumed that a time point when the first captured image is captured and a time point when the second captured image is captured are synchronized with each other. The position specifying unit 270 may perform temporal alignment between the acquired first captured image and second captured image by using image capture counts and the like given by an image capture device 2 to the first captured image and the second capture image. A time point synchronization method between the first captured image and the second captured image is not particularly limited, and an arbitrary method may be adopted.

In the present example embodiment, it is assumed that the image capture device 2 is two cameras, which are: an RGBD camera that captures a distance image and a color image; and an RGB camera that captures a color image. The distance image to be captured by the RGBD camera is similar to the above-mentioned first captured image. Moreover, the color image to be captured by the RGB camera is similar to the above-mentioned second captured image. Moreover, a color image to be captured by the RGBD camera is referred to as a third captured image.

Note that, though the present example embodiment will be described on the assumption that the image capture device 2 that captures the first captured image and the third captured image is one RGBD camera, the image capture device 2 may be devices different from each other. In this case, it is preferable that, in the first captured image and the third captured image, the image capture time point and image capture position thereof be substantially the same. Moreover, it is preferable that the third captured image be an image different in type from the first captured image, and be the same image in type as the second captured image.

The first acquisition unit 210 acquires the first captured image and the third captured image. A method by which the first acquisition unit 210 acquires the first captured image and the third captured image is similar to that for the first acquisition unit 110. The first acquisition unit 210 supplies the acquired first captured image to the identification unit 130. Moreover, the identification unit 130 supplies the acquired third captured image to the position specifying unit 270.

The position specifying unit 270 maps the position on the first captured image and the position on the second captured image to each other.

From the identification unit 130, the position specifying unit 270 receives, for example, such an identification result 152 as illustrated in FIG. 5. Moreover, the position specifying unit 270 receives the third captured image from the first acquisition unit 210.

Moreover, the position specifying unit 270 receives the second captured image from the second acquisition unit 120. The position specifying unit 270 maps the position of the first captured image and the position of the second captured image to each other on the basis of the identification result 152, the second captured image, and the third captured image.

Figure 13:
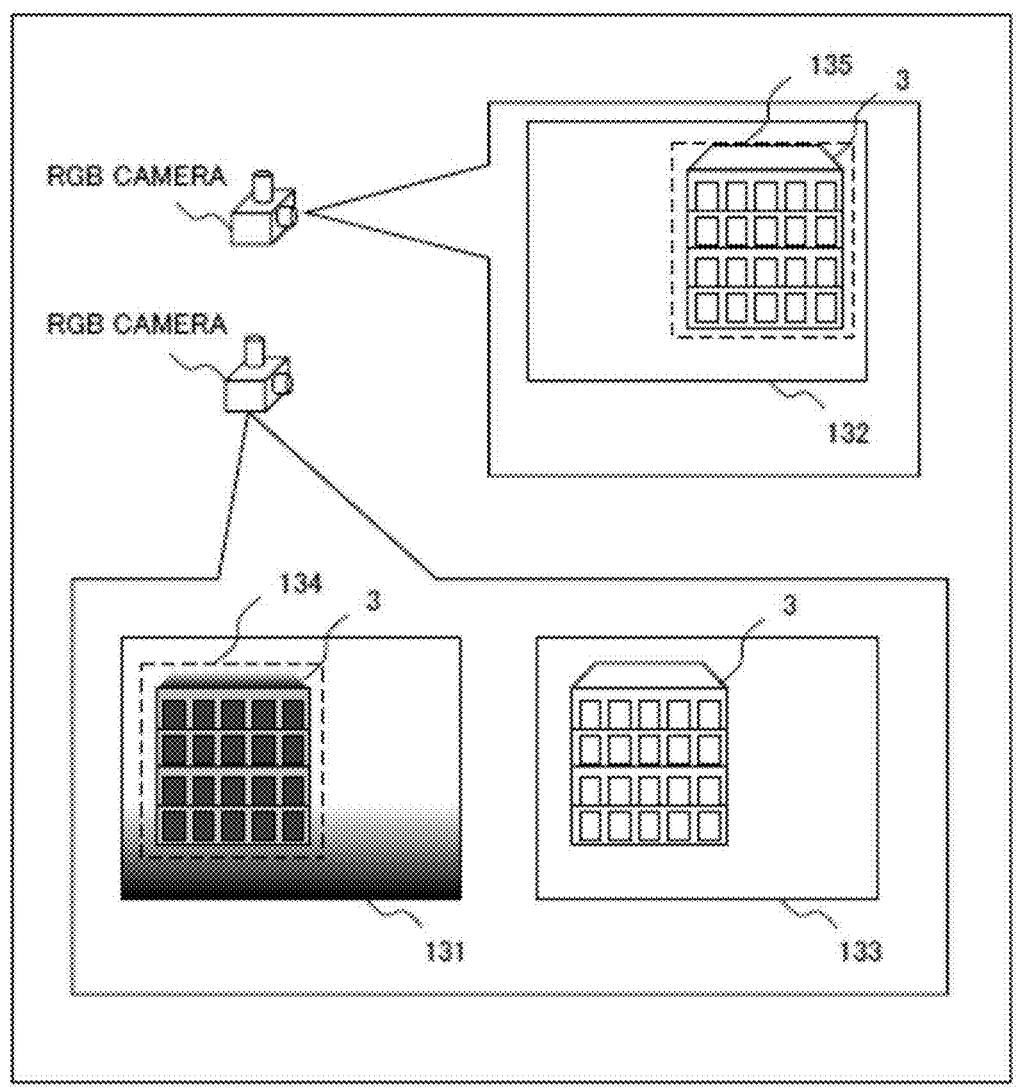
FIG. 13 is a diagram for explaining an operation of a position specifying unit.

Referring to FIG. 13, an operation of the position specifying unit 270 will be described. FIG. 13 is a diagram for explaining the operation of the position specifying unit 270.

The RGBD camera captures a first captured image 131 and a third captured image 133. Moreover, the RGB camera captures a second captured image 132. As illustrated in FIG. 13, it is assumed that the position of the product shelf 3 on the image differs between the second captured image 132 and the third captured image 133.

First, the position specifying unit 270 maps the position of the third captured image 133 and the position of the second captured image 132, which are the same images in type, to each other. The position specifying unit 270 matches the second captured image 132 and the third captured image 133 with each other, thereby mapping the positions thereof to each other. For such matching as described above, template matching (NPL 2) or a feature point matching method (PTL 3) can be used. Herein, assuming that a mapping function for use in the mapping is $\varphi_A(\cdot)$ ("•" is an arbitrary variable), a coordinate on the third captured image 133 is $x_{133}$, and a coordinate on the second captured image 132 is $x_{132}$, then $x_{132}=\varphi_A(x_{133})$ is established.

Next, the position specifying unit 270 maps the position of the third captured image 133 and the position of the first captured image 131, which are images of different types, to each other. The template matching may be used for the mapping. Alternatively, the mapping may be performed in such a manner that the cameras are calibrated in advance to calculate a correspondence relationship between the positions. Assuming that a coordinate on the first captured image 131 is $x_{131}$ and the mapping function for use in the mapping is $\varphi_B(\cdot)$, then $x_{133}=\varphi_B(x_{131})$ is established.

Thus, the coordinate on the third captured image 133, which corresponds to the coordinate $x_{131}$ on the first captured image 131, can be calculated by $x_{132}=\varphi_A(\varphi_B(x_{131}))$. Note that, it is not necessary that all the coordinates have a one-to-one relationship, and all the coordinates is not necessary to be a one-to-one relationship, and may have a plurality-to-plurality relationship or a probabilistic correspondence relationship.

By the identification processing by the identification unit 130, a rectangular shape 134 represented by the rectangular shape information 52 is obtained. Then, by the above-mentioned mapping, the position specifying unit 270 can specify the position on the second captured image 132, which corresponds to a position of the rectangular shape 134, as a rectangular shape 135.

Note that, the position specifying unit 270 may perform the position mapping by fixing a positional relationship between the RGBD camera and the RGB camera and performing calibration (which is processing of calculating a conversion parameter between two data).

The position specifying unit 270 supplies rectangular shape information (a mapping result), which expresses the rectangular shape 135 on the second captured image 132, to the generation unit 240.

The generation unit 240 generates the learning data 161 by using the rectangular shape information supplied from the position specifying unit 270, the identification result 152 supplied from the identification unit 130, and the second captured image. Generation processing for the learning data 161, which is performed by the generation unit 240, is different from the learning data 161, which is performed by the generation unit 140, in that not the rectangular shape information 52 included in the identification result 152 but the rectangular shape information supplied from the position specifying unit 270 is used. In other points, both of the methods may be similar to each other.

Figure 14:
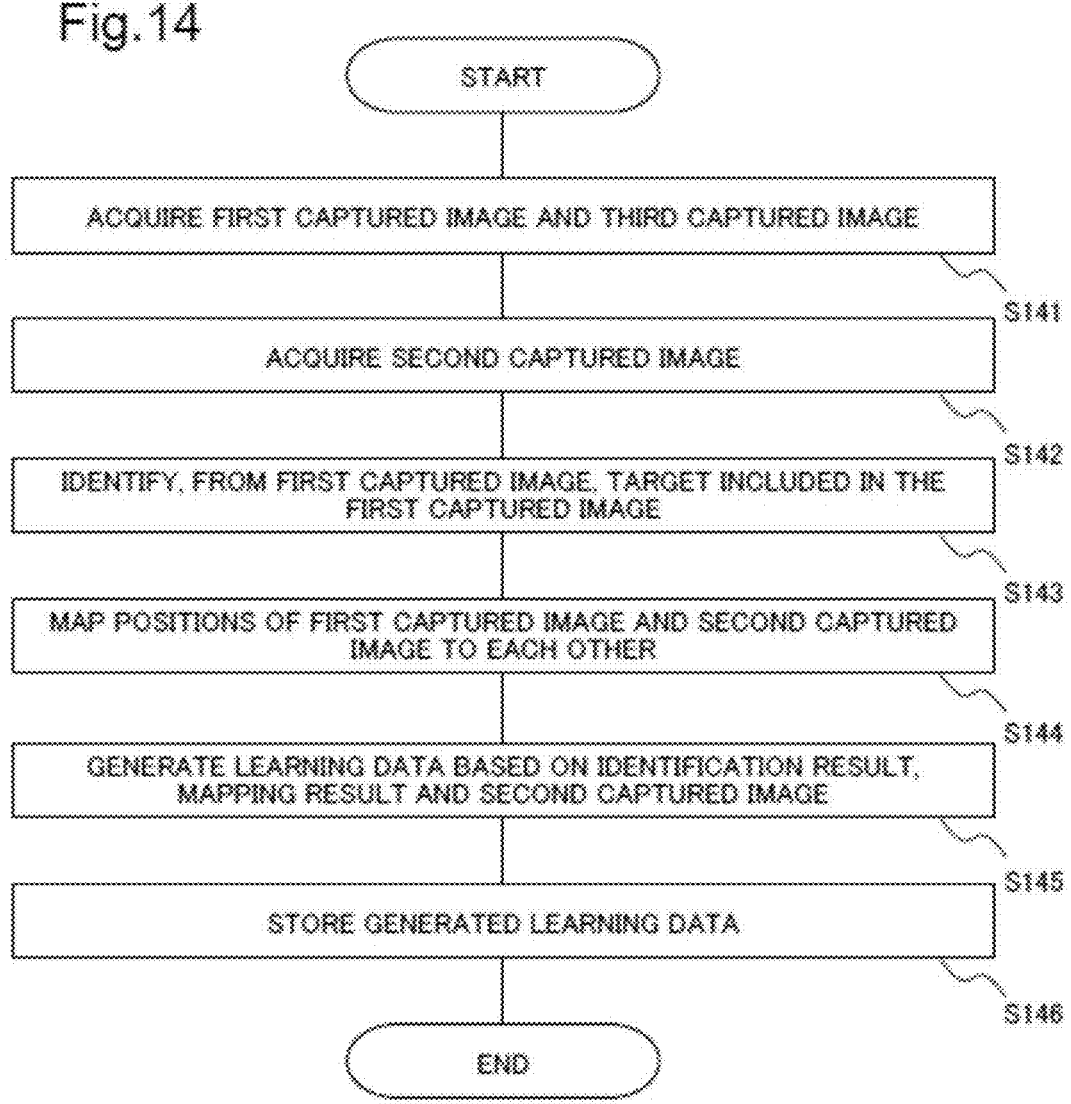
FIG. 14 is a flowchart illustrating one example of an operation flow of the image processing device according to the second example embodiment.

FIG. 14 is a flowchart illustrating one example of an operation flow of the learning data generation device 200 according to the present example embodiment.

As illustrated in FIG. 14, the first acquisition unit 210 acquires the first captured image and the third captured image, which are obtained by capturing, for example, the product shelf 3 as illustrated in FIG. 13 (Step S141). Moreover, the second acquisition unit 120 acquires the second captured image (Step S142). Note that, Step S142 may be performed simultaneously with Step S141, or may be performed in a reverse order.

The identification unit 130 identifies the target, which is included in the first captured image, from the first captured image (Step S143). Then, the identification unit 130 generates the identification result in which the information that indicates the type, presence of the identified target, or the motion of the identified target is associated with the first captured image.

Then, the position specifying unit 270 maps the positions of the first captured image 131 and the second captured image 132 to each other (Step S144). Specifically, the position specifying unit 270 maps the positions of the first captured image 131 and the third captured image 133 to each other, and maps the positions of the third captured image 133 and the second captured image 132 to each other.

Then, the generation unit 240 generates the learning data 161 on the basis of the identification result, the mapping result in Step S144, and the second captured image (Step S145). Then, the generation unit 240 stores the generated learning data 161 in the second storage unit 160 (Step S146).

As described above, the learning data generation device 200 according to the present example embodiment maps the positions of the first captured image 131 and the second captured image 132 to each other by using the position specifying unit 270.

For example, when recognition processing is performed in a retail shop or the like by using the existing surveillance camera, then the surveillance camera acquires the second captured image, and the image capture device 2 that acquires the first captured image and the third captured image is installed in the retail shop or the like. In this way, the learning data generation device 200 can efficiently generate learning data as in the above-mentioned first example embodiment. In this way, according to the learning data generation device 200 according to the present example embodiment, the existing surveillance camera can be used efficiently. Note that, the recognition processing and the identification processing to be performed by the identification unit 130 may be the same processing or different pieces of processing.

Third Example Embodiment

Figure 15:
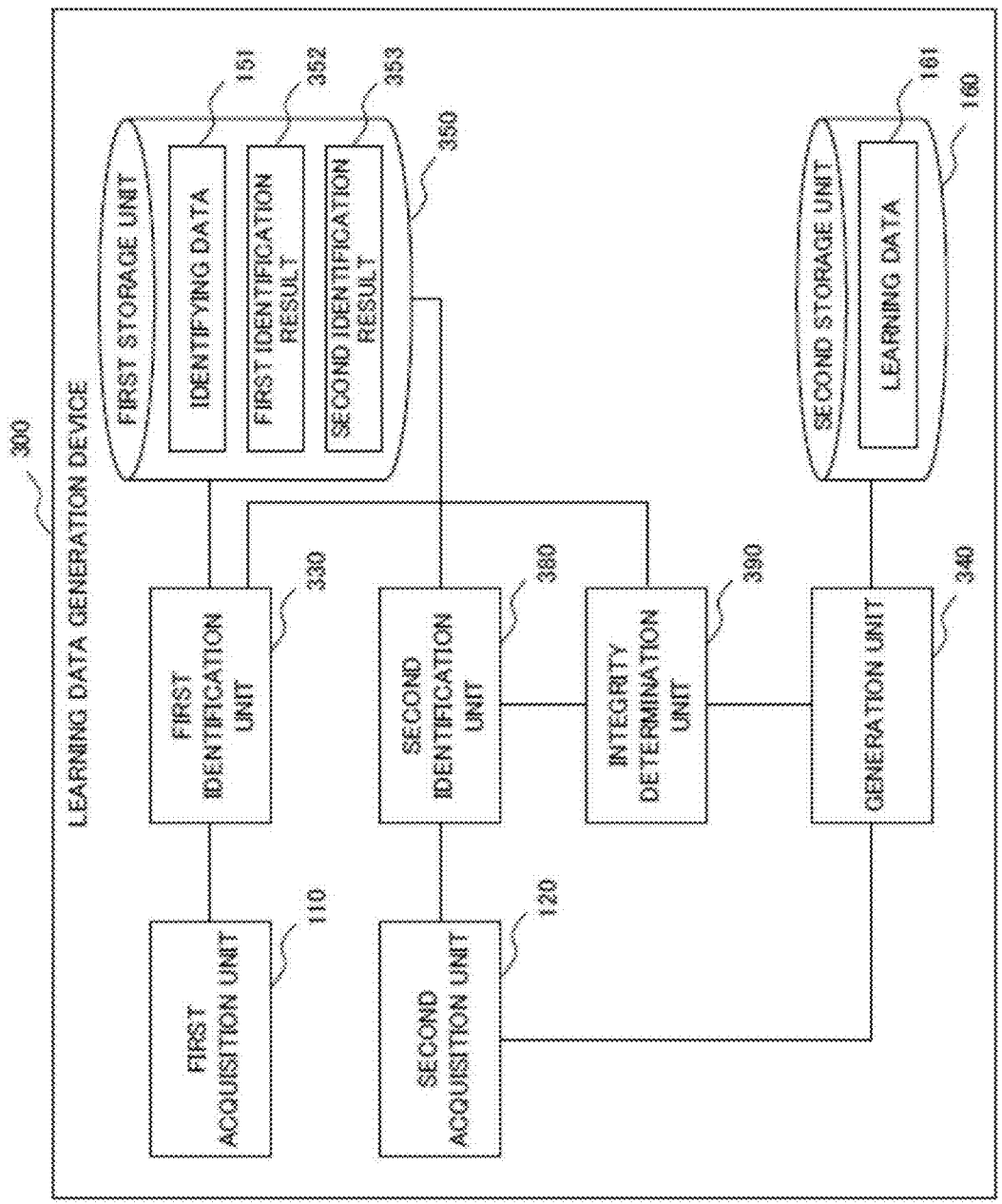
FIG. 15 is a functional block diagram illustrating one example of a functional configuration of an image processing device according to a third example embodiment.

A third example embodiment of the present disclosure will be described. FIG. 15 is a functional block diagram illustrating one example of a functional configuration of a learning data generation device 300 according to the present example embodiment. As illustrated in FIG. 15, the learning data generation device 300 according to the present example embodiment includes a first acquisition unit 110, a second acquisition unit 120, a first identification unit 330, a generation unit 340, a first storage unit 350, a second storage unit 160, a second identification unit 380, and an integrity determination unit 390. Note that, the learning data generation device 300 according to the present example embodiment is configured to further include the second identification unit 380 and the integrity determination unit 390 in the learning data generation device 100 described in the first example embodiment; however, may be configured to include the second identification unit 380 and the integrity determination unit 390 in the learning data generation device 200. Note that, the same reference numerals will be assigned to blocks which have the same functions as those of the blocks included in the drawings described in the above-mentioned first example embodiment, and a detailed description thereof will be omitted.

The first identification unit 330 performs similar processing to that of the above-mentioned identification unit 130. The first identification unit 330 stores an identification result as a first identification result 352 in the first storage unit 350. Moreover, the first identification unit 330 supplies the first identification result 352 to the integrity determination unit 390. The first identification result 352 is a similar identification result to the above-mentioned identification result 152.

The second identification unit 380 identifies a target from the second captured image. The second identification unit 380 may perform the identification processing by a similar method to that of the identification unit 130, or may perform the identification processing by a different method. The second identification unit 380 stores an identification result as a second identification result 353 in the first storage unit 350. Moreover, the second identification unit 380 supplies the second identification result 353 to the integrity determination unit 390. Note that, in the present example embodiment, a description will be made of the matter that the first identification unit 330 and the second identification unit 380 are separate from each other; however, the first identification unit 330 and the second identification unit 380 may be formed integrally with each other.

The first storage unit 350 stores the identifying data 151, the first identification result 352 and the second identification result 353.

The integrity determination unit 390 determines whether or not the first identification result 352 and the second identification result 353 have integrity therebetween. Hereinafter, processing of the integrity determination unit 390 will be described.

(Integrity Determination Example 1)

It is assumed that the first identification result 352 is a result of identifying whether or not the target is a person, the result being based on the first captured image as a distance image, and that the second identification result 353 is a result of identifying whether or not the target is a person, the result being based on the second captured image as a color image.

When the identification results at positions of the first captured image and the second captured image, the positions corresponding to each other, are both identified to be a person, i.e., when a label included in the first identification result 352 and a label included in the second identification result 353 are "person", then the integrity determination unit 390 determines that both of the labels match with each other (have integrity therebetween). When either one of the label included in the first identification result 352 and the label included in the second identification result 353 is "person", and another is other than the "person", the integrity determination unit 390 determines that both of the identification results do not match with each other. Note that, when both of the labels are other than "person", the integrity determination unit 390 determines that the first identification result and the second identification result match with each other.

(Integrity Determination Example 2)

It is assumed that the first identification result 352 is a result of identifying whether or not the target is a head of a person, the result being based on the first captured image as a distance image, and that the second identification result 353 is a result of identifying whether or not the target is a person, the result being based on the second captured image as a color image. Note that, like the above-mentioned identification example 2, the present example will be described on the assumption that the depth camera of the image capture device 2 captures images of product shelves and a person in a shop, for example, from a fixed point with an overhead view.

When the identification results at such corresponding positions of the first captured image and the second captured image coincide with each other, i.e., when the label included in the first identification result 352 and the label included in the second identification result 353 indicate the head, the integrity determination unit 390 determines that the first identification result 352 and the second identification result 353 match with each other (have integrity therebetween). When the label included in the first identification result 352 and the label included in the second identification result 353 are different from each other, the integrity determination unit 390 determines that both of the identification results do not match with each other.

(Integrity Determination Example 3)

It is assumed that the first identification result 352 is a result of identifying movement of a product, the result being based on the first captured image as a distance image, and that the second identification result 353 is a result of identifying movement of a product, the result being based on the second captured image as a color image.

When the identification results at such corresponding positions of the first captured image and the second captured image coincide with each other, i.e., when a label that represents a motion of the product, which is included in the first identification result 352, and a label that represents a motion of the product, which is included in the second identification result 353, indicate the same motion, then the integrity determination unit 390 determines that the first identification result 352 and the second identification result 353 match with each other (have integrity therebetween). When the label included in the first identification result 352 and the label included in the second identification result 353 are different from each other, the integrity determination unit 390 determines that both of the identification results do not match with each other.

A determination method of the integrity determination unit 390 is not limited to this, and a variety of determination methods may be adopted. The integrity determination unit 390 supplies a determination result, and the first identification result 352 and the second identification result 353, which are used for the determination, to the generation unit 340.

The generation unit 340 generates learning data on the basis of the determination result, the first identification result 352 and the second identification result 353, which are supplied from the integrity determination unit 390, and the second captured image supplied from the second acquisition unit 120. Specifically, when the determination result indicates that both of the identification results do not match with each other, the generation unit 340 determines that further learning is required for the identification, and generates the learning data 161 from the second captured image on the basis of the rectangular shape information included in the first identification result 352 or the second identification result 353.

Figure 16:
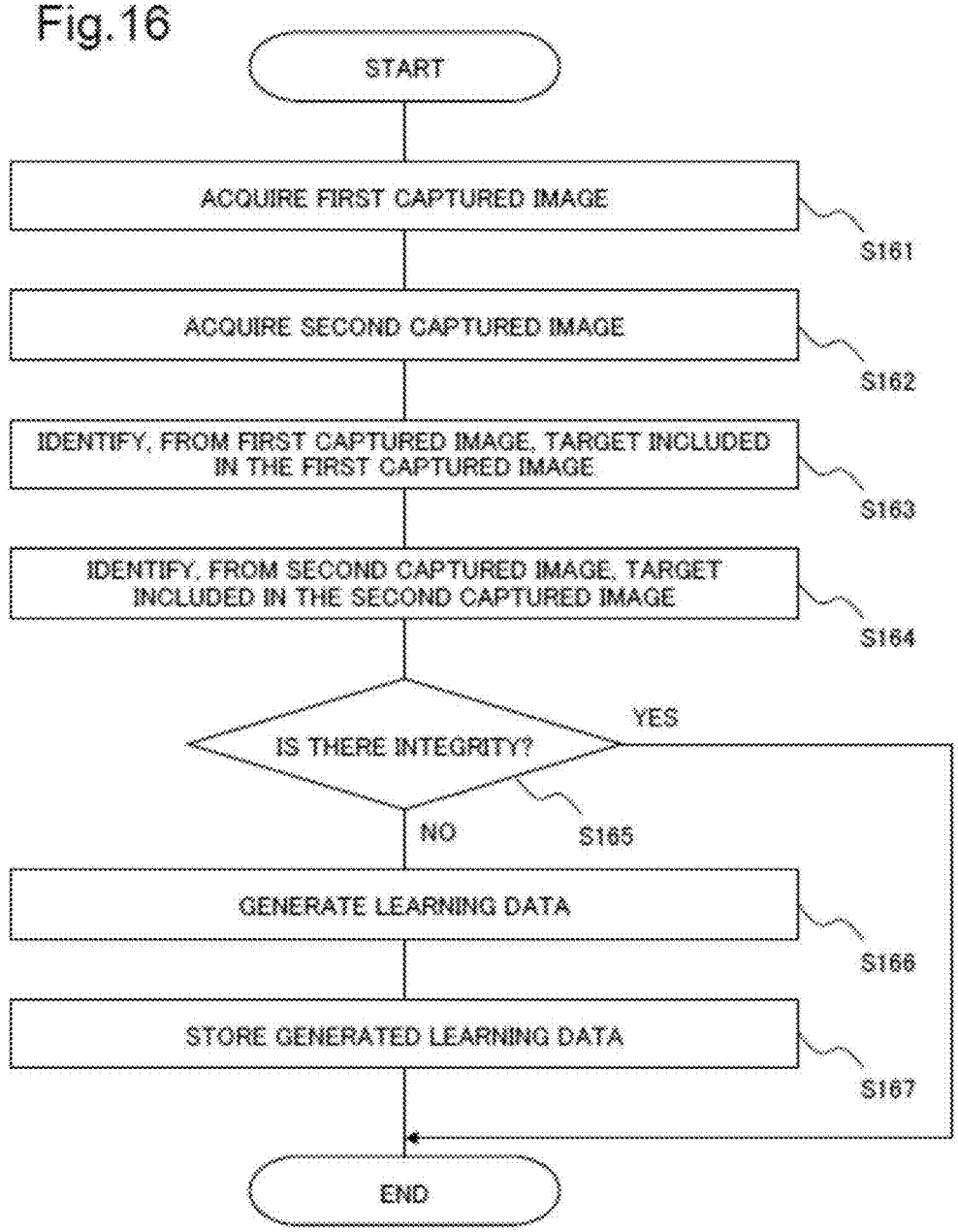
FIG. 16 is a flowchart illustrating one example of an operation flow of the image processing device according to the third example embodiment.

FIG. 16 is a flowchart illustrating one example of an operation flow of the learning data generation device 300 according to the present example embodiment. As illustrated in FIG. 16, the first acquisition unit 110 acquires the first captured image (Step S161). Moreover, the second acquisition unit 120 acquires the second captured image (Step S162). Note that, Step S162 may be performed simultaneously with Step S161, or may be performed in a reverse order.

The first identification unit 330 identifies the target, which is included in the first captured image, from the first captured image (Step S163). Then, the first identification unit 330 generates the identification result in which the information that indicates the type, presence of the identified target, or the motion of the identified target is associated with the first captured image.

Moreover, the second identification unit 380 identifies the target, which is included in the second captured image, from the second captured image (Step S164). Then, the second identification unit 380 generates the identification result in which the information that indicates the type, presence of the identified target, or the motion of the identified target is associated with the second captured image.

Note that, Step S164 may be performed simultaneously with Step S163, or may be performed in a reverse order.

Then, the integrity determination unit 390 determines whether or not the first identification result 352 and the second identification result 353 have integrity therebetween (Step S165). When the first identification result 352 and the second identification result 353 have integrity therebetween (YES in Step S165), the generation unit 340 determines that there are sufficient learning data for identifying the first captured image and the second captured image, and ends the processing without generating the learning data 161.

When the first identification result 352 and the second identification result 353 do not have integrity therebetween (NO in Step S165), the generation unit 340 generates the learning data 161 on the basis of at least either one of the first identification result and the second identification result and the second captured image acquired in Step S112 (Step S166). Then, the generation unit 340 stores the generated learning data 161 in the second storage unit 160 (Step S167).

As described above, according to the learning data generation device 300 according to the present example embodiment, the integrity determination unit 390 determines whether or not the integrity between the first identification result for the first captured image and the second identification result for the second captured image is present. In this way, the generation unit 340 can generate the learning data 161 by using the captured image from which learning is determined to be required. Hence, the learning data generation device 300 can generate learning data 161 for improving recognition accuracy.

For example, when recognition accuracy is insufficient in an environment where a system that performs recognition processing by an existing surveillance camera is already operated, then according to the present example embodiment, the existing surveillance camera is used as the image capture device 2 that acquires the second captured image, and the learning data generation device 300 generates the learning data 161 by using the second captured image. In this way, the learning data generation device 300 can improve the recognition accuracy of the system.

Fourth Example Embodiment

A fourth example embodiment of the present disclosure will be described with reference to the drawings. The present example embodiment will describe a minimum configuration of solving the problem in the present disclosure.

Figure 17:
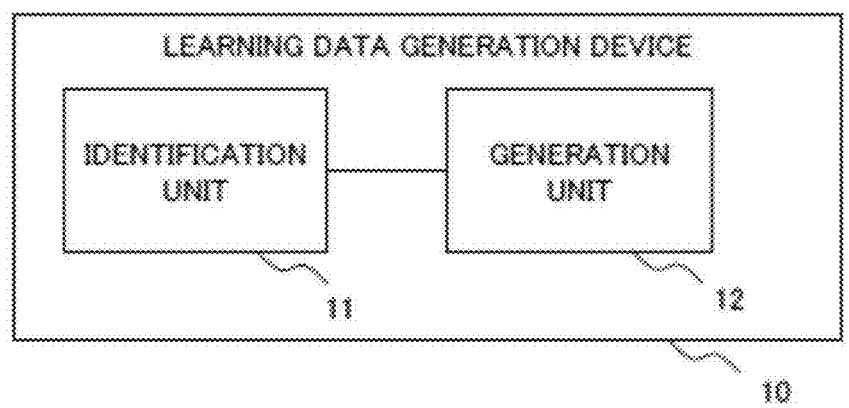
FIG. 17 is a functional block diagram illustrating one example of a functional configuration of an image processing device according to a fourth example embodiment.

FIG. 17 is a functional block diagram illustrating one example of a functional configuration of a learning data generation device 10 according to the present example embodiment. As illustrated in FIG. 17, the learning data generation device 10 according to the present example embodiment includes an identification unit 11 and a generation unit 12.

The identification unit 11 has functions of the above-mentioned identification unit 130 and first identification unit 330. The identification unit 11 identifies a target, which is included in a first captured image, from the first captured image, and generates an identification result in which information that indicates a type, presence of the identified target, or a motion of the identified target is associated with the first captured image. For example, the identification unit 11 may perform identification processing by adopting any of the above-mentioned identification examples 1 to 4, or may perform the identification processing by other identification methods. The identification unit 11 supplies a generated identification result to the generation unit 12.

The generation unit 12 has functions of the above-mentioned generation unit 140, generation unit 240 and generation unit 340. The generation unit 12 generates learning data on the basis of the identification result and a second captured image that is related to the first captured image and different in type from the first captured image.

The learning data which the generation unit 12 generates may be, for example, any of the learning data 161 illustrated in FIGS. 8 to 10, or may be one with another format.

Figure 18:
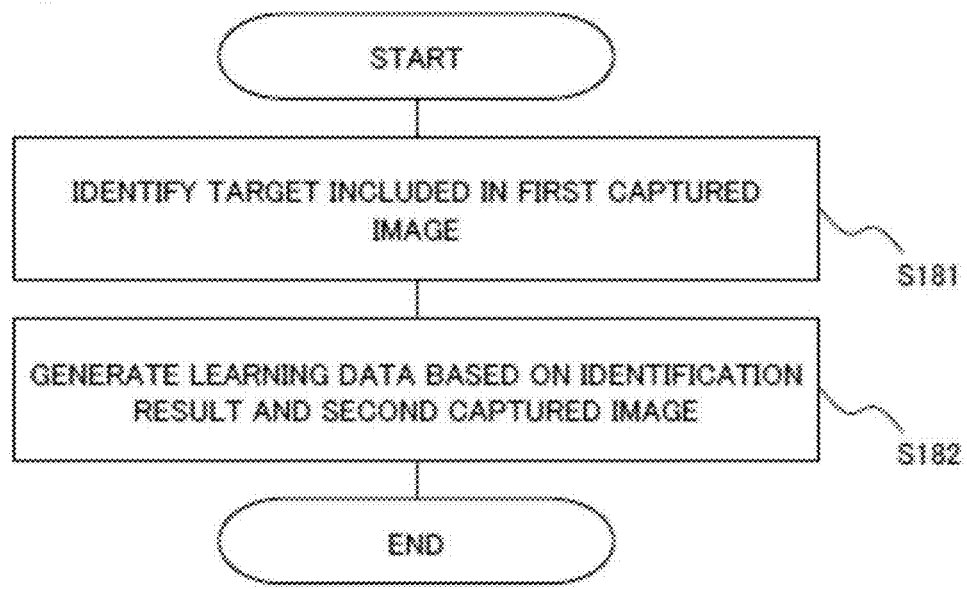
FIG. 18 is a flowchart illustrating one example of an operation flow of the image processing device according to the fourth example embodiment.

FIG. 18 is a flowchart illustrating one example of an operation of the learning data generation device 10 according to the present example embodiment. As illustrated in FIG. 18, the identification unit 11 identifies the target included in the first captured image (Step S181). The identification unit 11 generates the identification result in which the information that indicates the type, presence of the identified target, or the motion of the identified target is associated with the first captured image.

The generation unit 12 generates the learning data on the basis of the identification result generated by the identification unit 11 and the second captured image that is related to the first captured image and different in type from the first captured image (Step S182).

As described above, the learning data generation device 10 according to the present example embodiment generates the learning data on the basis of the identification result obtained by performing the identification processing for the first captured image, and on the basis of the second captured image different in type from the first captured image. In this way, the learning data generation device 10 can reduce the cost of the manual annotation work. Hence, the learning data generation device 100 can efficiently generate the learning data.

Note that, as mentioned above, the above-mentioned learning data generation devices (100, 200, 300 and 10) may be configured to be incorporated in the image capture device 2. Moreover, for example, when the device that captures the first captured image and the device that captures the second captured image are achieved by separate image capture devices 2, it is preferable that the learning data generation devices (100, 200, 300 and 10) be mounted on the device that captures the first captured image. At this time, the device that captures the second captured image may be a surveillance camera already installed in a shop. In this case, it suffices if the image capture device 2 that captures the first captured image is installed in the vicinity of the surveillance camera or at such a position where a position of the second captured image that is captured by the surveillance camera and a position of the first captured image can be mapped to each other. Then, the image capture device 2 that captures the first captured image may be detached when the generation of the learning data is ended. In this way, the detached image capture device 2 may be installed in another shop.

In a case of performing the identification processing of a person or a product by using the second captured image, it suffices if the surveillance camera that captures the second captured image is used. Accordingly, for example, in a case of applying the system, which performs the image recognition, to a chain of a large number of retail shops, the image capture device 2 that captures the first captured image can be suitably reused. Hence, adoption of such a configuration can contribute to the reduction of system introduction cost.

Moreover, each of the learning data generation devices (100, 200, 300 and 10) may further include an identification instrument that has performed learning by using the generated learning data. In this way, the learning data generation device can perform the recognition processing with high accuracy by using the identification instrument.

(Regarding Hardware Configuration)

Figure 19:
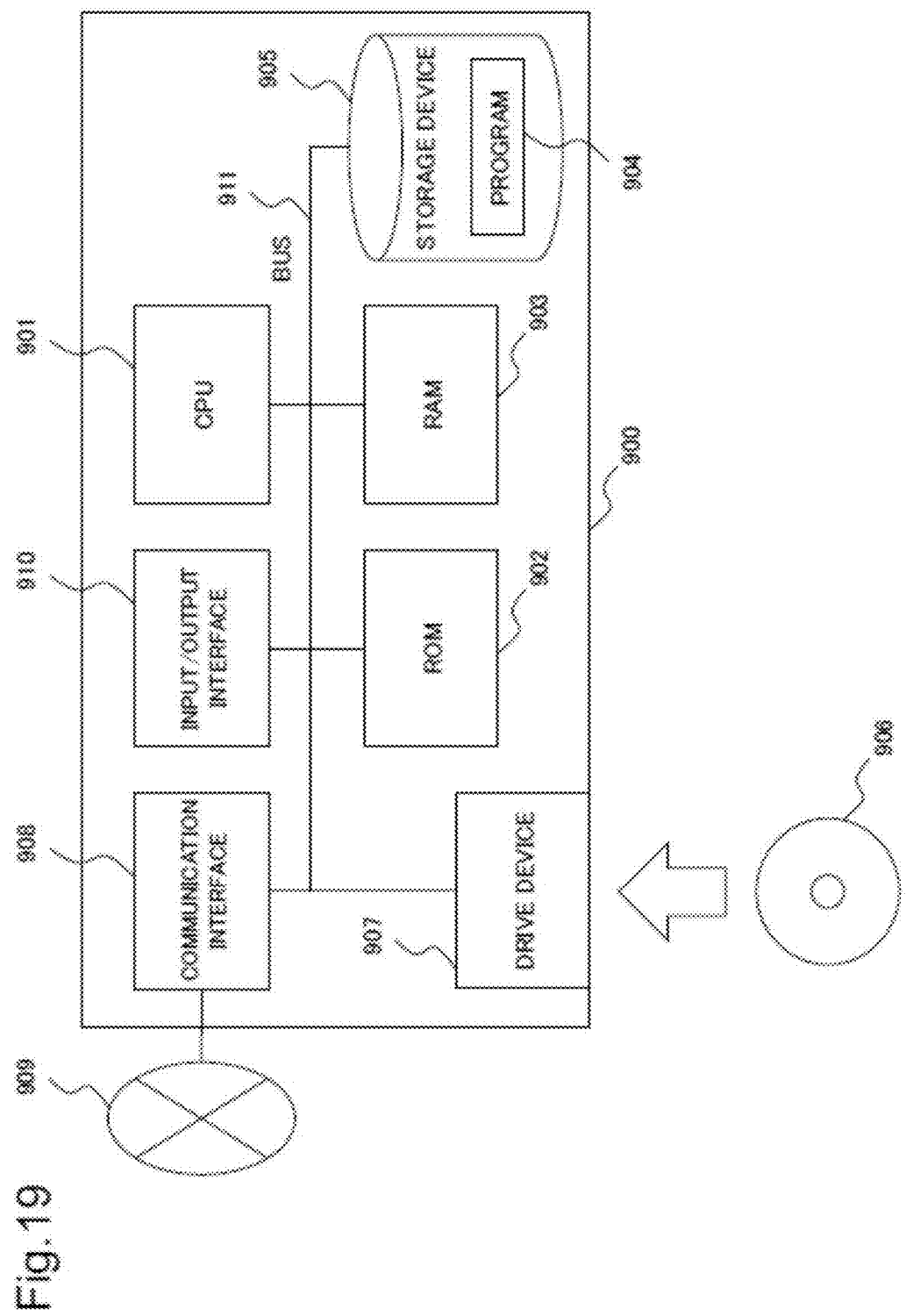
FIG. 19 is a diagram illustratively explaining a hardware configuration of a computer (an information processing apparatus) capable of achieving the respective example embodiments of the present disclosure.

In the respective example embodiments of the present disclosure, the respective components of the respective devices indicate functional unit blocks. A part or all of the respective components of the respective devices are achieved, for example, by any combinations of an information processing apparatus 900 as illustrated in FIG. 19 and programs. FIG. 19 is a block diagram illustrating one example of a hardware configuration of the information processing apparatus 900, which achieves the respective components of the respective devices. As one example, the information processing apparatus 900 includes a configuration as below.

A central processing unit (CPU) 901
A read only memory (ROM) 902
A random access memory (RAM) 903
A program 904 to be loaded in the RAM 903
A storage device 905 that stores the program 904
A drive device 907 that performs reading and writing with a recording medium 906
A communication interface 908 to be connected to a communication network 909
An input/output interface 910 that inputs and outputs data
A bus 911 that connects the respective components to one another The respective components of the respective devices in the respective example embodiments are achieved in such a manner that the CPU 901 acquires and executes the program 904 that achieves these functions. For example, the program 904 that achieves the functions of the respective components of the respective devices is stored in advance in the storage device 905 and the ROM 902, and is executed by being loaded in the RAM 903 by the CPU 901 according to needs. Note that the program 904 may be supplied to the CPU 901 via the communication network 909, or may be stored in advance in the recording medium 906, and the drive device 907 may read out the program and supply the program to the CPU 901.

Methods of achieving the respective devices include various modified examples. For example, each device may be achieved by any combination of an information processing apparatus 900, which is separate for each component, and a program. Moreover, a plurality of the components provided in the respective devices may be achieved by any combination of a single information processing apparatus 900 and a program.

Moreover, a part or all of the respective components of the respective devices are achieved by other general-purpose or dedicated circuitry, processors, and the like and combinations thereof. Such components may be composed of a single chip, or may be composed of a plurality of chips connected to one another via a bus.

A part or all of the respective components of the respective devices may be achieved by combinations of the above-mentioned circuitry and the like and a program.

When a part or all of the respective components of the respective devices are achieved by pluralities of information processing apparatuses, circuitries and the like, the pluralities of information processing apparatuses, circuitries and the like may be arranged centrally, or may be arranged dispersedly. For example, the information processing apparatuses, the circuitries and the like may be achieved as a mode in which the respective components are connected to one another via a communication network, the mode including a client and server system, a cloud computing system, and the like.

Note that, the above-mentioned respective example embodiments are suitable example embodiments of the present disclosure, and the scope of the present disclosure is not limited only to the above-described respective example embodiments. It is possible for those skilled in the art to correct and replace the above-described respective example embodiments within the scope without departing from the spirit of the present disclosure, and to construct embodiments modified in various ways.

The present invention has been described above while taking the above-mentioned example embodiments as typical examples. However, the present invention is not limited to the above-mentioned example embodiments. In other words, various modes understandable by those skilled in the art can be applied to the present invention within the scope of the present invention.

This application claims priority based upon Japanese Patent Application No. 2017-076765 filed on Apr. 7, 2017, the entire disclosure of which is incorporated herein by reference.

REFERENCE SIGNS LIST

1 Learning data generation system
2 Image capture device
3 Product shelf
10 Learning data generation device
11 Identification unit
12 Generation unit
100 Learning data generation device
110 First acquisition unit
120 Second acquisition unit
130 Identification unit
140 Generation unit
150 First storage unit
160 Second storage unit
210 First acquisition unit
240 Generation unit
270 Position specifying unit
330 First identification unit
340 Generation unit
380 Second identification unit
390 Integrity determination unit

What is claimed is:

1. A learning data generation device comprising:
at least one memory configured to store a computer program; and
at least one processor configured to execute the computer program to perform:
identifying a target included in a first captured image, and generating a first identification result in which a type, presence of the identified target, or a motion of the identified target is associated with the first captured image;
identifying a target included in a second captured image that is related to the first captured image and different in type from the first captured image, and generating a second identification result in which the type, the presence of the identified target, or the motion of the identified target is associated with the second captured image;
determining whether or not integrity between the first identification result and the second identification result is present; and
generating learning data, based on a determination result, by using the first identification result and the second captured image.

2. The learning data generation device according to claim 1, wherein
the at least one processor is configured to execute the computer program to perform:
generating the learning data in which information that indicates a region on the second captured image, the region corresponding to a region of the target, and the type of the identified target or the motion of the identified target are associated with the second captured image.

3. The learning data generation device according to claim 1, wherein
the at least one processor is configured to execute the computer program to perform:
generating the learning data in which an image of a region on the second captured image, the region corresponding to a region of the target in the second captured image, and the type of the identified target or the motion of the identified target are associated with each other.

4. The learning data generation device according to claim 1, wherein
the at least one processor is configured to execute the computer program to perform:
identifying at least one of the type, the presence, and the motion of the target, based on at least one of a size, a shape, a position, a moving distance, and a moving speed of the target, and
generating the learning data in which a result of the identification is used as a label at a learning time.

5. The learning data generation device according to claim 1, further comprising
specifying a position in the second captured image, the position corresponding to a position in the first captured image, by using a third captured image of a same type as the second captured image, the third captured image being to be captured by an image capture device that captures the first captured image, wherein
generating the learning data, by using the specified position in the second captured image, the first identification result, and the second captured image.

6. The learning data generation device according to claim 1, wherein
the first captured image is a distance image, and
the second captured image is a color image.

7. The learning data generation device according to claim 1, wherein
the learning data generation device is mounted on an image capture device that acquires the first captured image.

8. A learning data generation method comprising:
identifying a target included in a first captured image, and generating an identification result in which a type, presence of the identified target, or a motion of the identified target is associated with the first captured image;
identifying a target included in a second captured image that is related to the first captured image and different in type from the first captured image, and generating a second identification result in which the type, the presence of the identified target, or the motion of the identified target is associated with the second captured image;
determining whether or not integrity between the first identification result and the second identification result is present; and
generating learning data, based on a determination result, by using the first identification result and the second captured image.

9. The learning data generation method according to claim 8, wherein
the generating generates the learning data in which information that indicates a region on the second captured image, the region corresponding to a region of the target, and the type of the identified target or the motion of the identified target are associated with the second captured image.

10. The learning data generation method according to claim 8, wherein
the generating generates the learning data in which an image of a region on the second captured image, the region corresponding to a region of the target in the second captured image, and the type of the identified target or the motion of the identified target are associated with each other.

11. The learning data generation method according to claim 8, wherein
the identifying a target included in the first captured image and the identifying a target included in the second captured image identify at least one of the type, the presence, and the motion of the target, based on at least one of a size, a shape, a position, a moving distance, and a moving speed of the target, and
the generating generates the learning data in which a result of the identification is used as a label at a learning time.

12. The learning data generation method according to claim 8, further comprising
specifying a position in the second captured image, the position corresponding to a position in the first captured image, by using a third captured image of a same type as the second captured image, the third captured image being to be captured by an image capture device that captures the first captured image, wherein
the generating generates the learning data, by using the specified position in the second captured image, the first identification result, and the second captured image.

13. The learning data generation method according to claim 8, wherein
the first captured image is a distance image, and
the second captured image is a color image.

14. The learning data generation method according to claim 8, wherein
the learning data generation method is performed on an image capture device that acquires the first captured image.

15. A non-transitory recording medium storing a program for causing a computer to execute:
processing of identifying a target included in a first captured image, and generating a first identification result in which a type, presence of the identified target, or a motion of the identified target is associated with the first captured image;
processing of identifying a target included in a second captured image that is related to the first captured image and different in type from the first captured image, and generating a second identification result in which the type, the presence of the identified target, or the motion of the identified target is associated with the second captured image;

processing of determining whether or not integrity between the first identification result and the second identification result is present; and processing of generating learning data, based on a determination result, by using the first identification result and the second captured image.

* * * * *